US012749348B2

(12) United States Patent
Shumsky et al.

(10) Patent No.: US 12,749,348 B2
(45) Date of Patent: Sep. 29, 2026

(54) SYSTEM AND METHOD FOR DETERMINING LIVENESS USING FACE ROTATION

(71) Applicant: Regula Forensics, Inc., Reston, VA (US)

(72) Inventors: Ivan Shumsky, Tel Aviv (IL); Ihar Kliashchou, Warsaw (PL); Yury Rahazhynski, Daugavpils (LV); Alexander Lemeza, Warsaw (PL); Dzmitry Kasiuk, Warsaw (PL); Vasil Markevich, Warsaw (PL)

(73) Assignee: Regula Forensics, Inc., Reston, VA (US)

(*) Notice: Subject to any disclaimer, the term of this patent is extended or adjusted under 35 U.S.C. 154(b) by 108 days.

(21) Appl. No.: 18/739,012

(22) Filed: Jun. 10, 2024

(65) Prior Publication Data

US 2025/0037509 A1 Jan. 30, 2025

Related U.S. Application Data

(60) Provisional application No. 63/529,700, filed on Jul. 29, 2023.

(51) Int. Cl.

| | |
|---|---|
| ***G06V 40/40*** | (2022.01) |
| ***G06T 7/80*** | (2017.01) |
| ***G06V 40/60*** | (2022.01) |

(52) U.S. Cl.

CPC ................ *G06V 40/45* (2022.01); *G06T 7/80* (2017.01); *G06V 40/63* (2022.01); *G06T 2207/30168* (2013.01)

(58) Field of Classification Search

CPC ........ G06V 40/45; G06V 40/63; G06V 10/82; G06V 40/161; G06V 40/165;

(Continued)

(56) References Cited

U.S. PATENT DOCUMENTS

| | | | | |
|---|---|---|---|---|
| 10,331,942 | B2 * | 6/2019 | Wong | G06V 40/45 |
| 2016/0085299 | A1 | 3/2016 | Horesh | |

(Continued)

FOREIGN PATENT DOCUMENTS

| | | | |
|---|---|---|---|
| CN | 113642497 | A | 11/2021 |
| CN | 115512409 | A | 12/2022 |

OTHER PUBLICATIONS

Search report in PCT/US2024/039026, dated Feb. 3, 2026.

(Continued)

*Primary Examiner* — Atiba O Fitzpatrick

(74) *Attorney, Agent, or Firm* — Bardmesser Law Group

(57) ABSTRACT

Method of 3D face verification, includes verifying that user is positioned in standard orientation so that head rotation angles are small; capturing image of user's head at first position; generating PIN and transmitting it to a user device; upon receipt of the PIN, instructing the user to rotate his head to a first position indicated by the PIN and a corresponding graphic; repeating instructions to the user to rotate his head for all remaining values of the PIN, and capturing images of the head at positions corresponding to the remaining values of the PIN; transforming yaw and pitch angles of the user's head in the captured images into a polar coordinates graph; transforming the graph into a phase map; sending the phase map into machine learning classifier; securely sending and storing personal information to the server; determining, using the machine learning classifier, whether the head is a live 3D face.

11 Claims, 25 Drawing Sheets

(58) Field of Classification Search
CPC .... G06V 40/171; G06V 40/172; G06V 40/40; G06V 40/60; G06V 40/67; G06T 7/80; G06T 2207/30168; G06T 7/70; G06T 7/73; G06T 7/74; G06T 7/75; G06T 7/77
See application file for complete search history.

(56) References Cited

U.S. PATENT DOCUMENTS

| | | | | |
|---|---|---|---|---|
| 2016/0224855 | A1 | 8/2016 | Al-Hamad et al. | |
| 2016/0342832 | A1 | 11/2016 | Bud et al. | |
| 2016/0366129 | A1* | 12/2016 | Chen | G06V 40/67 |
| 2017/0185760 | A1* | 6/2017 | Wilder | G06F 21/32 |
| 2018/0157900 | A1 | 6/2018 | Ganong et al. | |
| 2018/0181737 | A1* | 6/2018 | Tussy | G06F 21/32 |
| 2018/0239955 | A1* | 8/2018 | Rodriguez | G06V 40/171 |
| 2018/0349682 | A1 | 12/2018 | Wong et al. | |
| 2019/0213311 | A1* | 7/2019 | Tussy | G06V 40/70 |
| 2020/0134148 | A1* | 4/2020 | Mortazavian | G06F 17/16 |
| 2022/0139546 | A1* | 5/2022 | Manjunath | H04L 9/3231 705/2 |
| 2023/0186685 | A1 | 6/2023 | Zhang et al. | |
| 2023/0368581 | A1* | 11/2023 | Takahashi | G06V 40/45 |
| 2025/0168162 | A1* | 5/2025 | Tussy | G06F 21/32 |

OTHER PUBLICATIONS

Search report in PCT/U.S. Pat. No. 2024039026, dated Jul. 1, 2026.

Castelblanco Alejandra et al., Dynamic face authentication systems: Deep learning verification for camera close-Up and head rotation paradigms, Computers & Security, Elsevier Science Publishers, Amsterdam, NL, Sep. 1, 2007, vol. 2, No. 3, pp. 537-547.

Mpiperis et al., 3-D Face Recognition With the Geodesic Polar Representation, IEEE Transactions on Information Forensics and Security, IEEE, USA Sep. 1, 2007, vol. 2, No. 3, pp. 537-547.

Chien S-I et al., Face and facial landmarks location based on log-polar mapping Database Compendex [Online], Engineering Information, Inc., New York, NY, US; and Lecture Notes in Computer Science, Springer Verlag, 2000, vol. 1811, pp. 379-386.

* cited by examiner

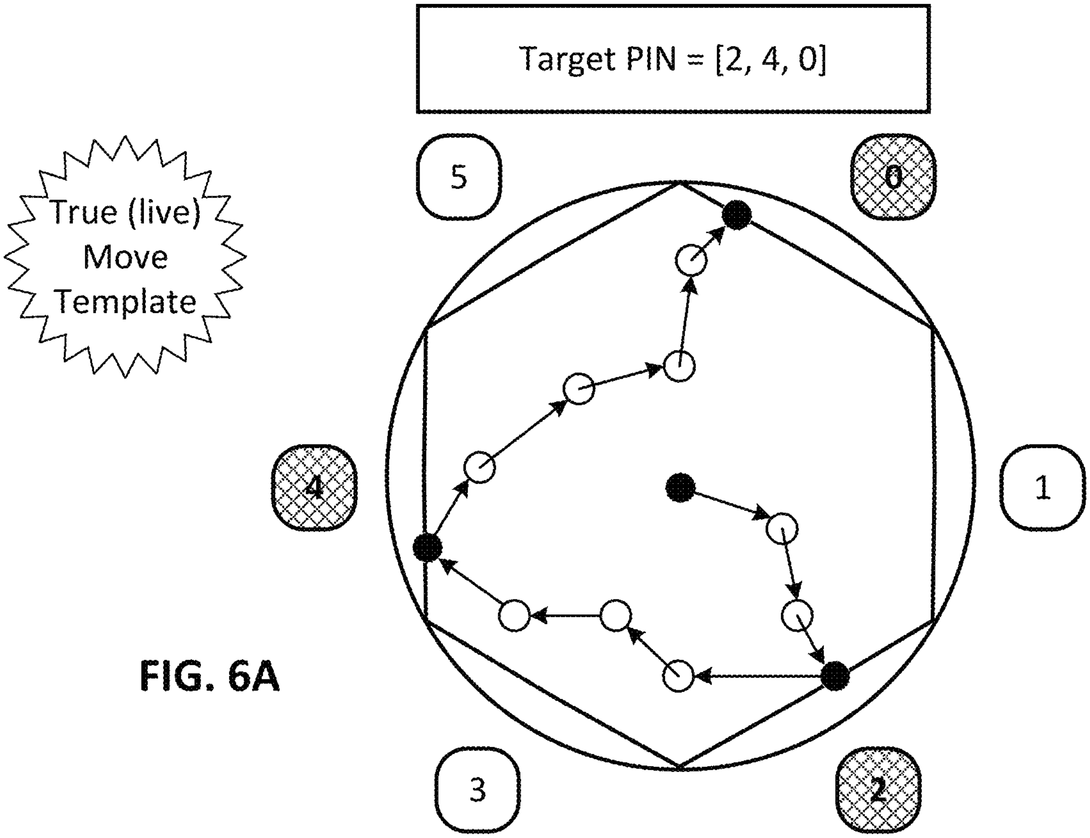
FIG. 6A
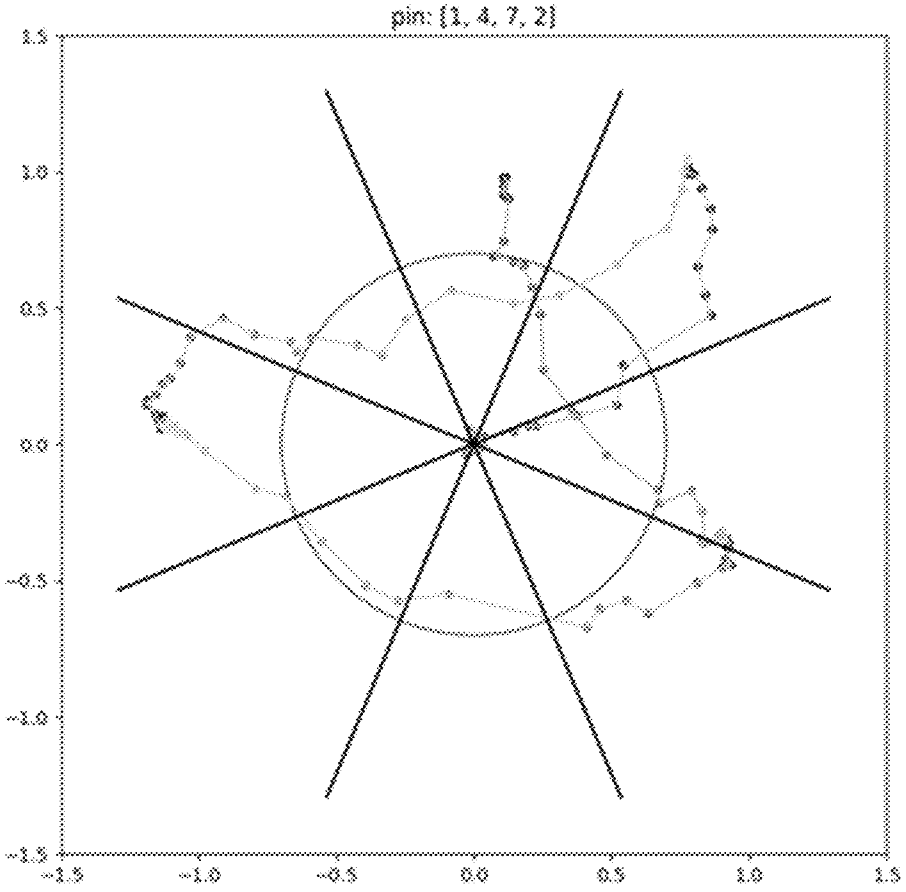

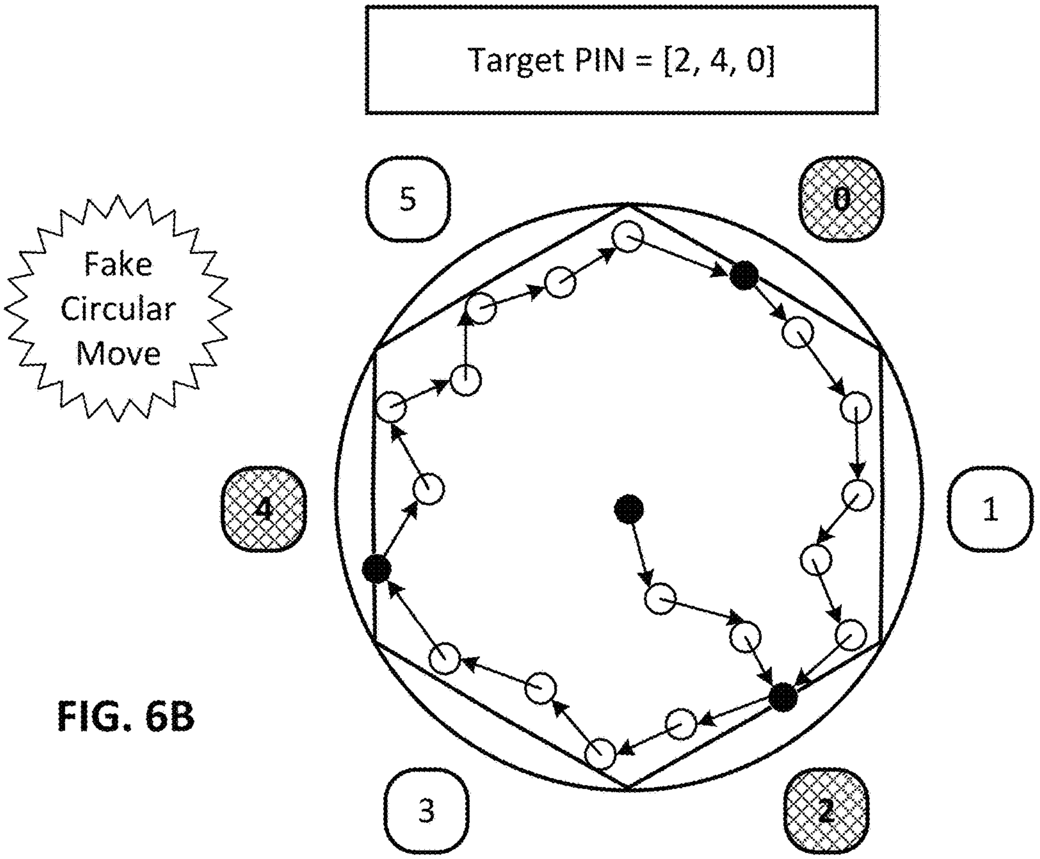
FIG. 6B
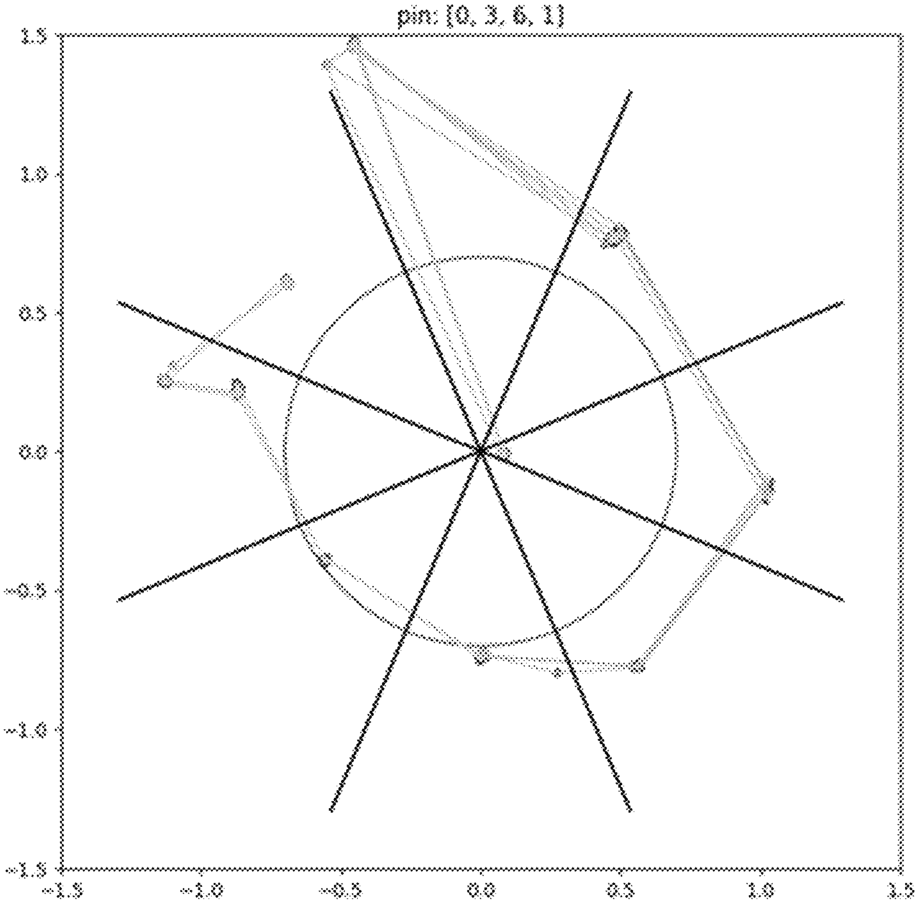

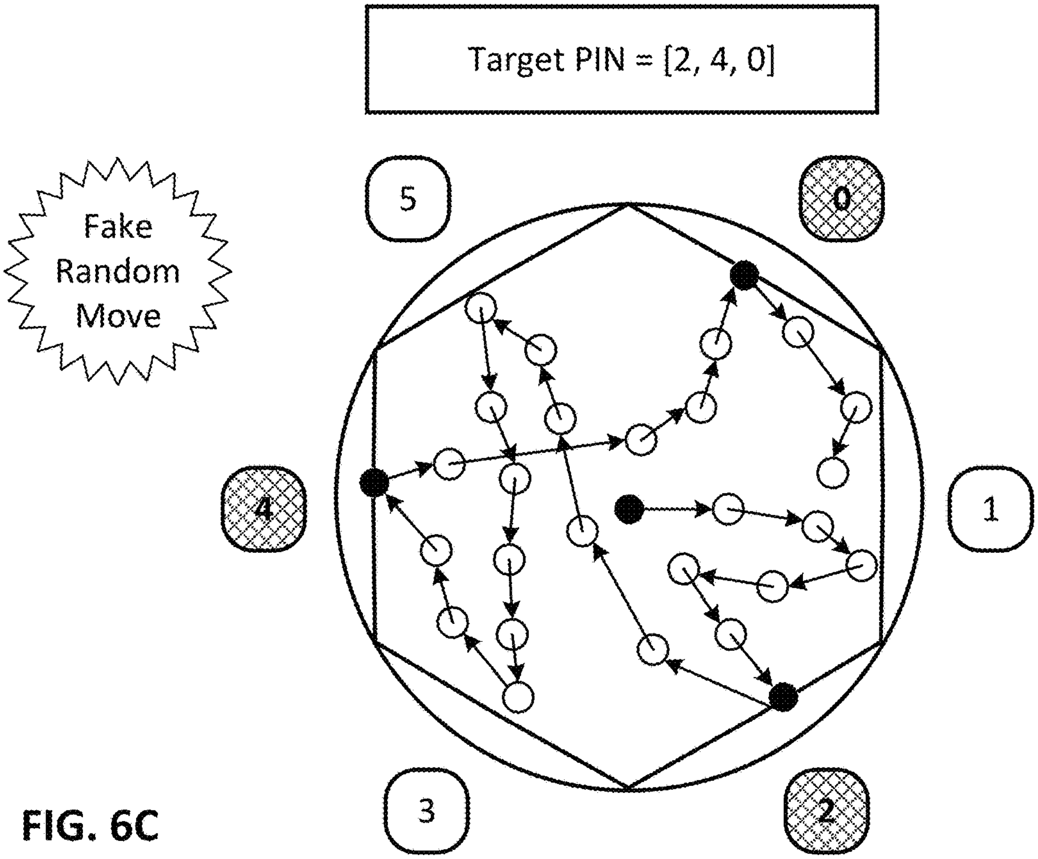
FIG. 6C
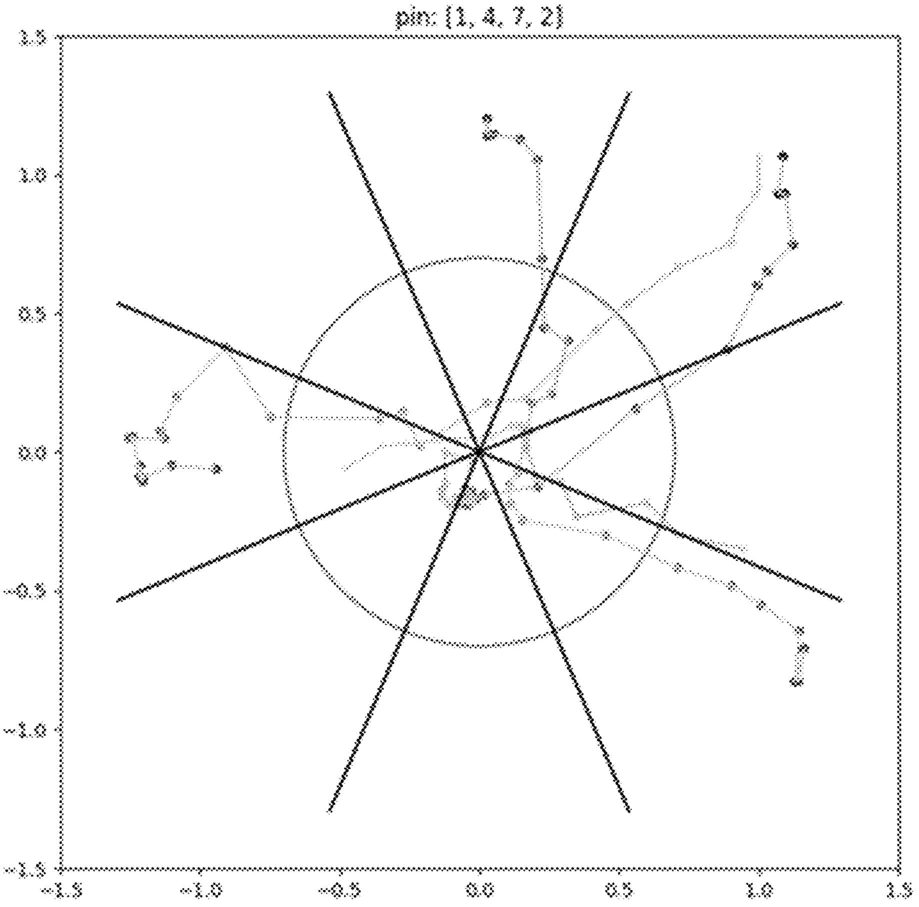

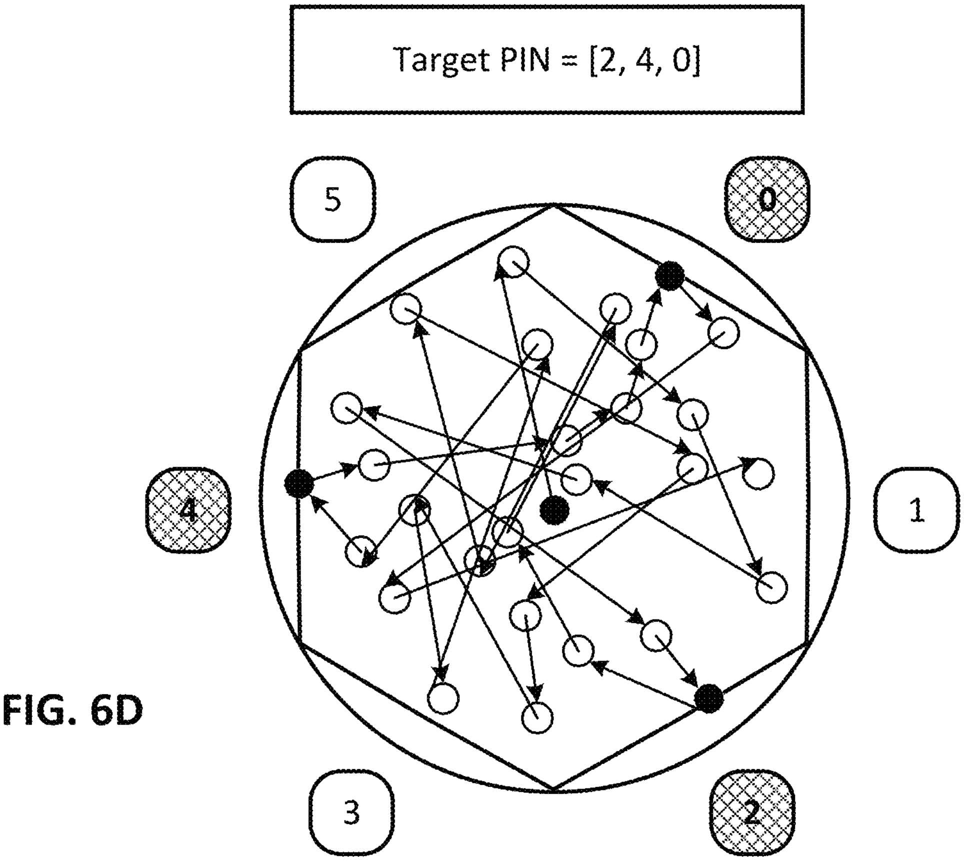
FIG. 6D
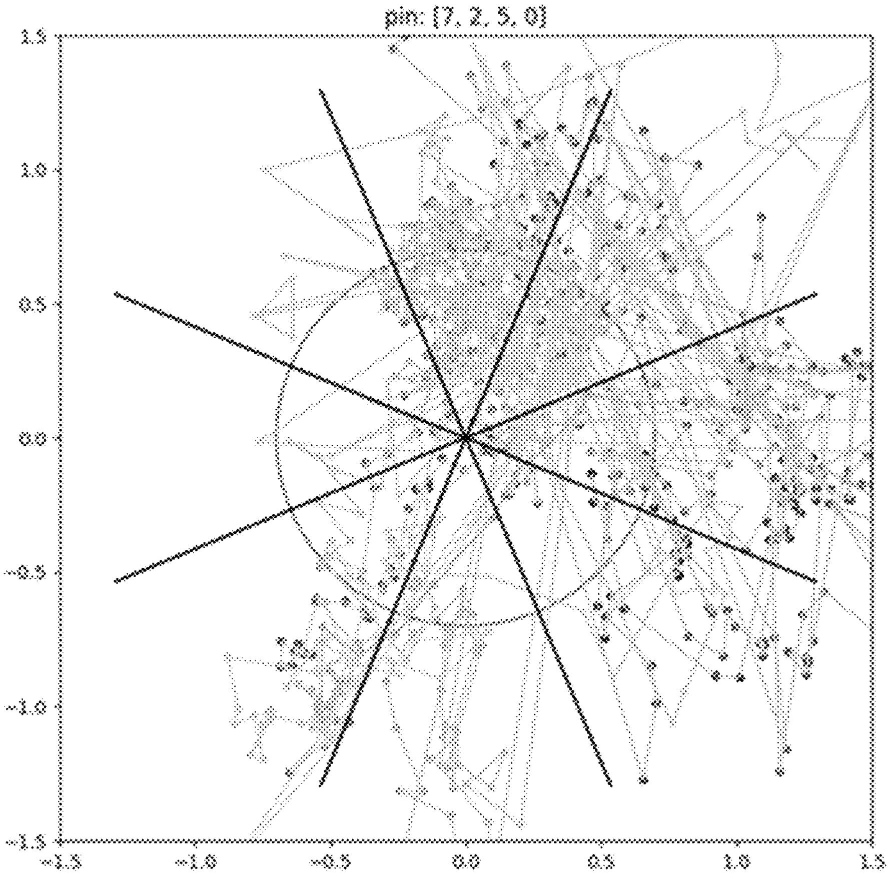

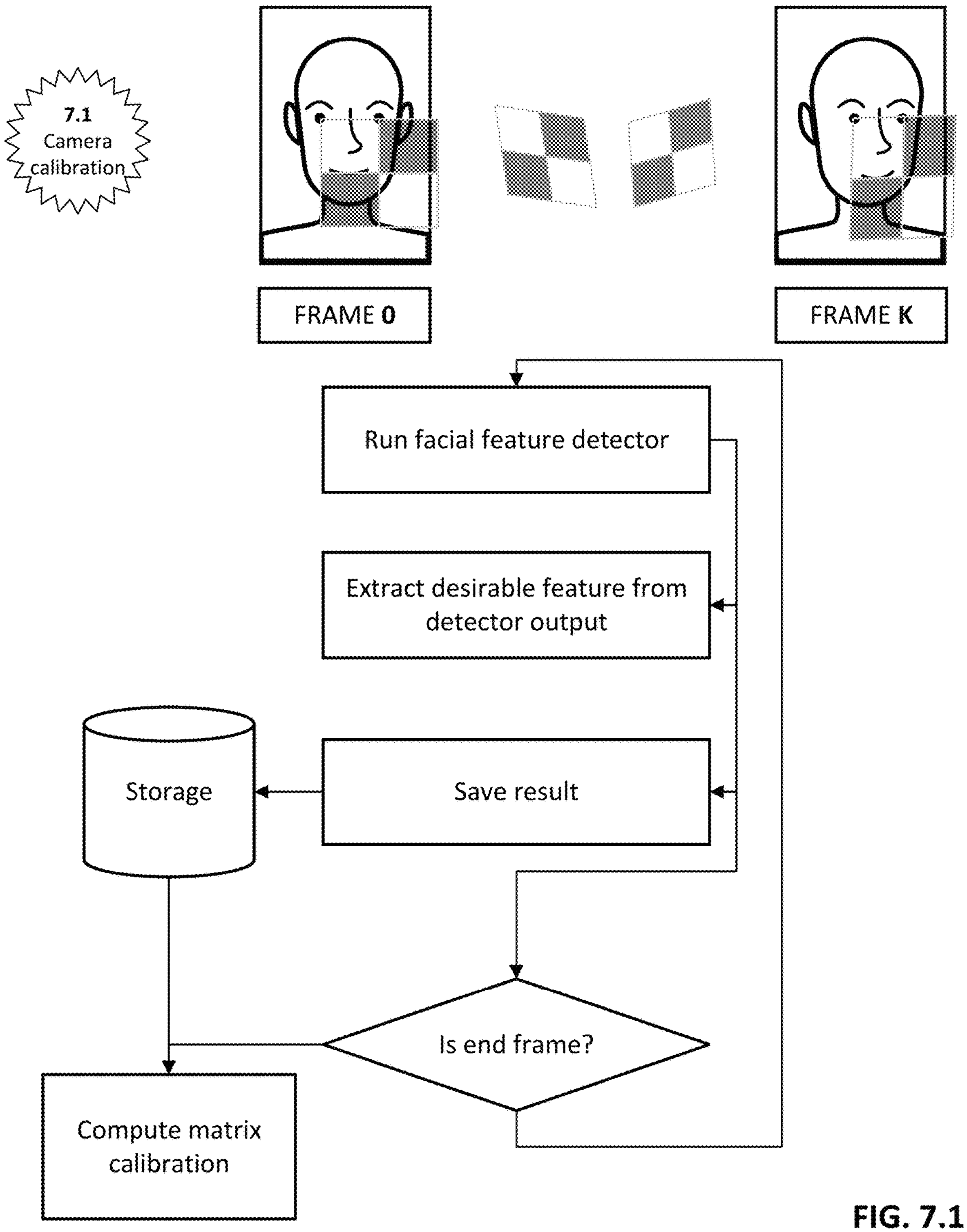
FIG. 7.1

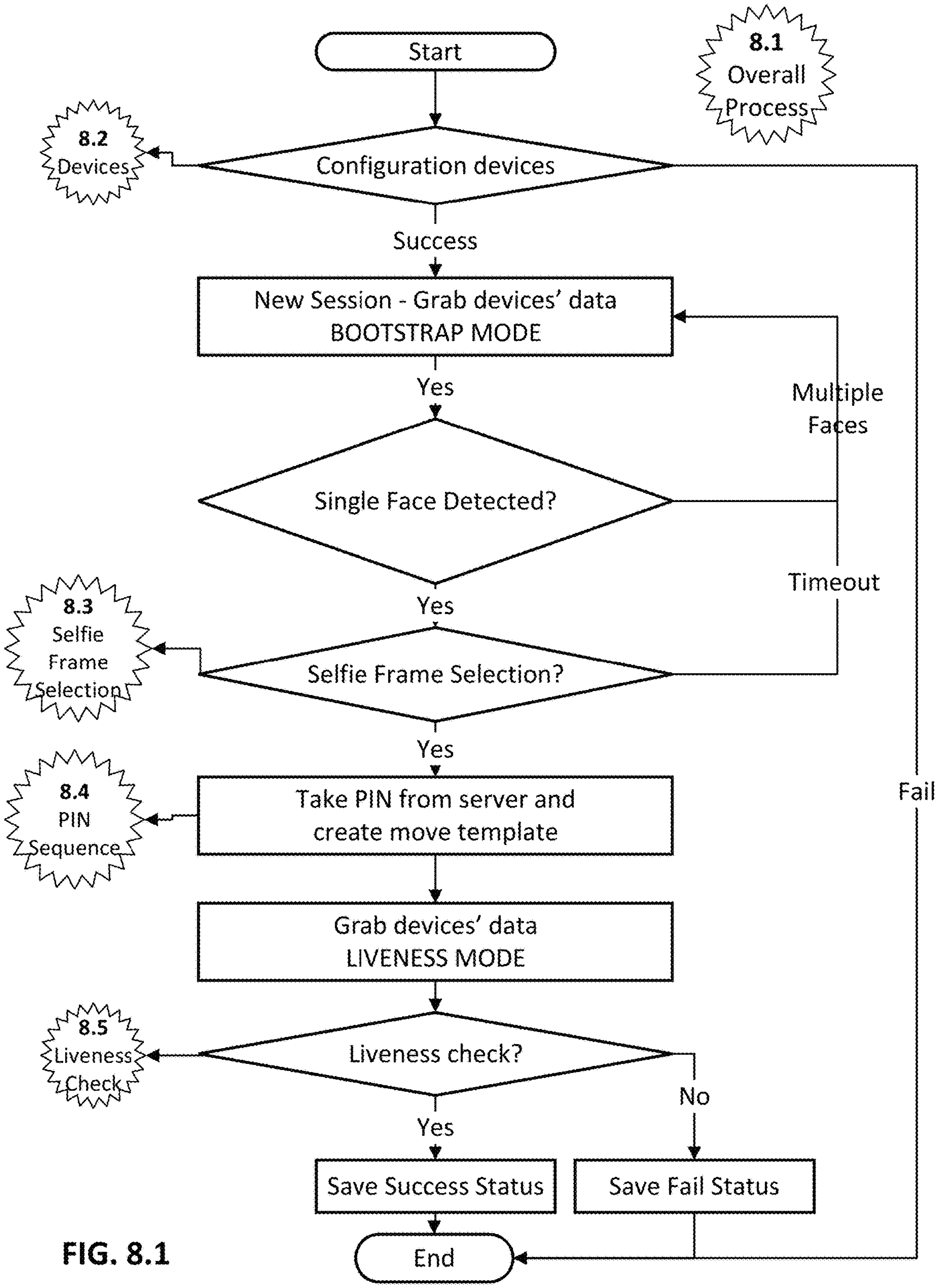
FIG. 8.1

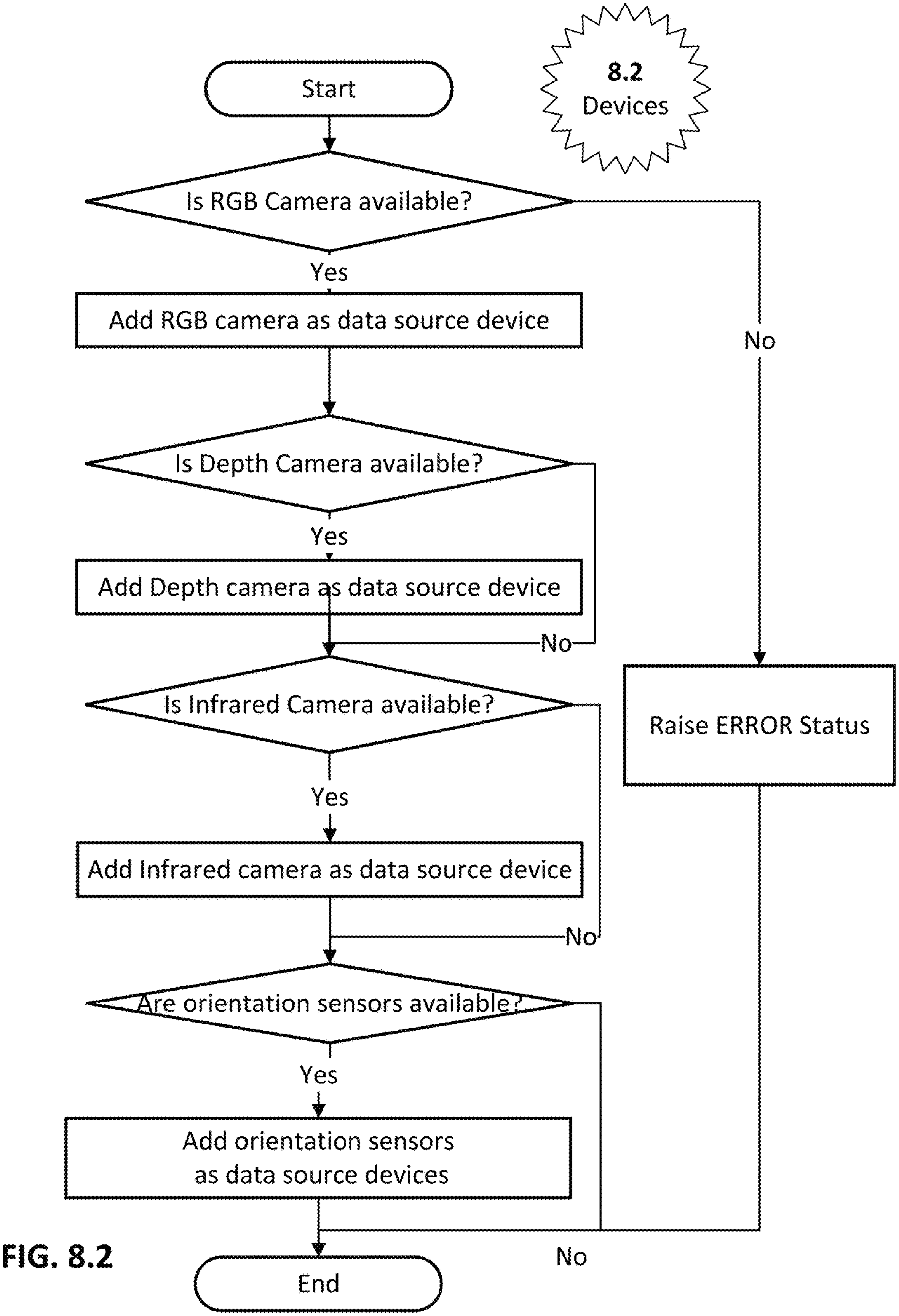
FIG. 8.2

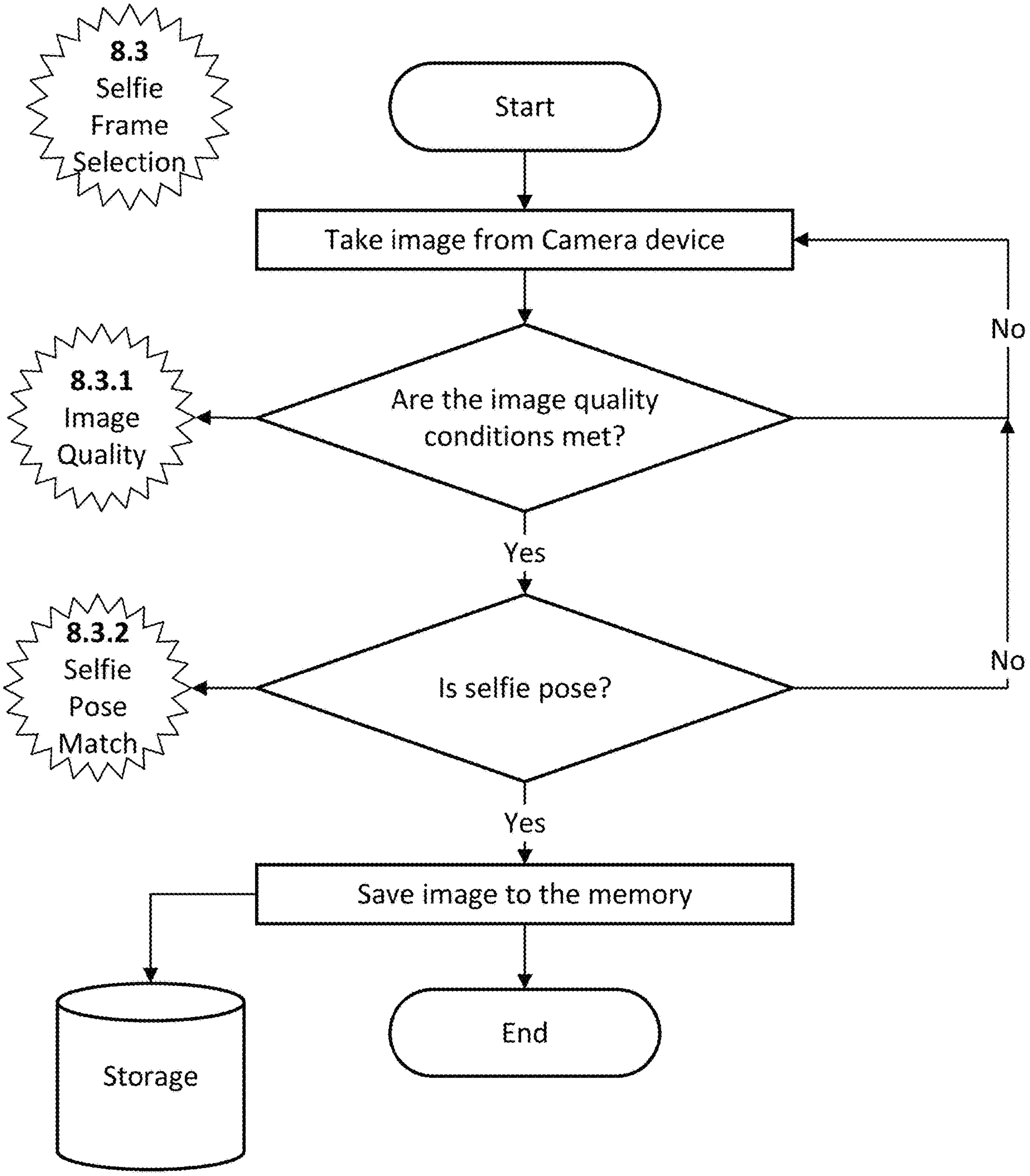
FIG. 8.3

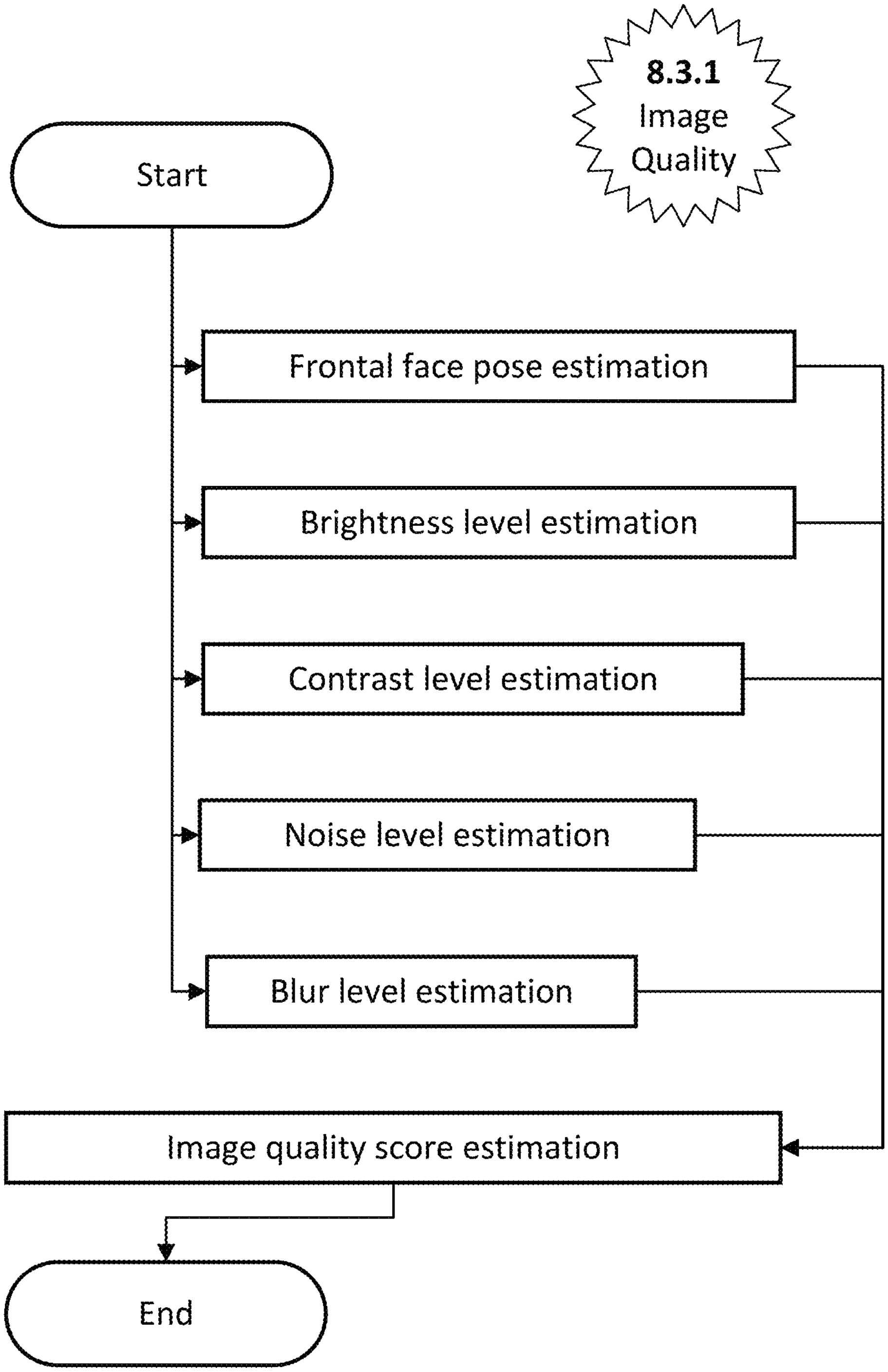
FIG. 8.3.1

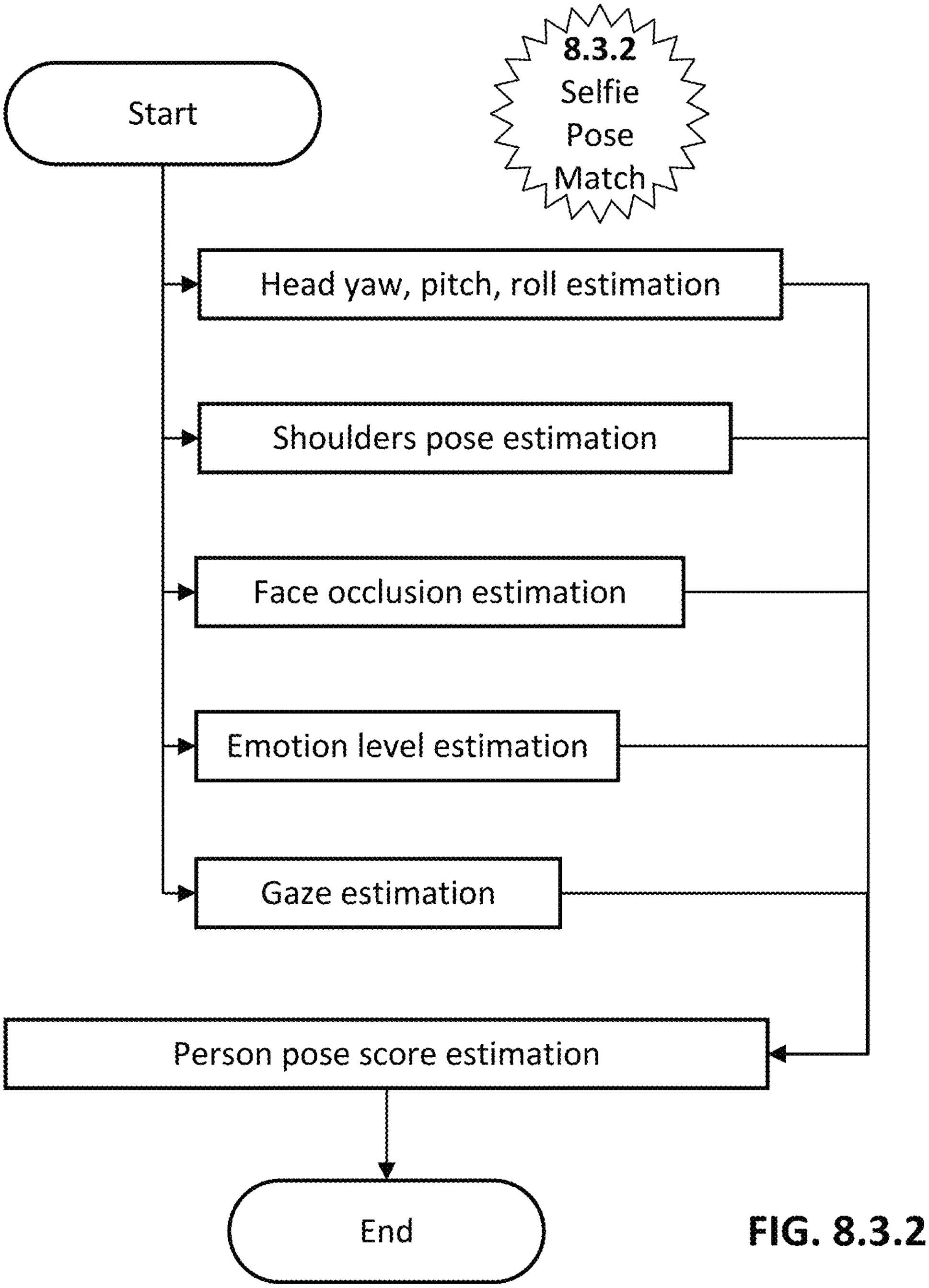
FIG. 8.3.2

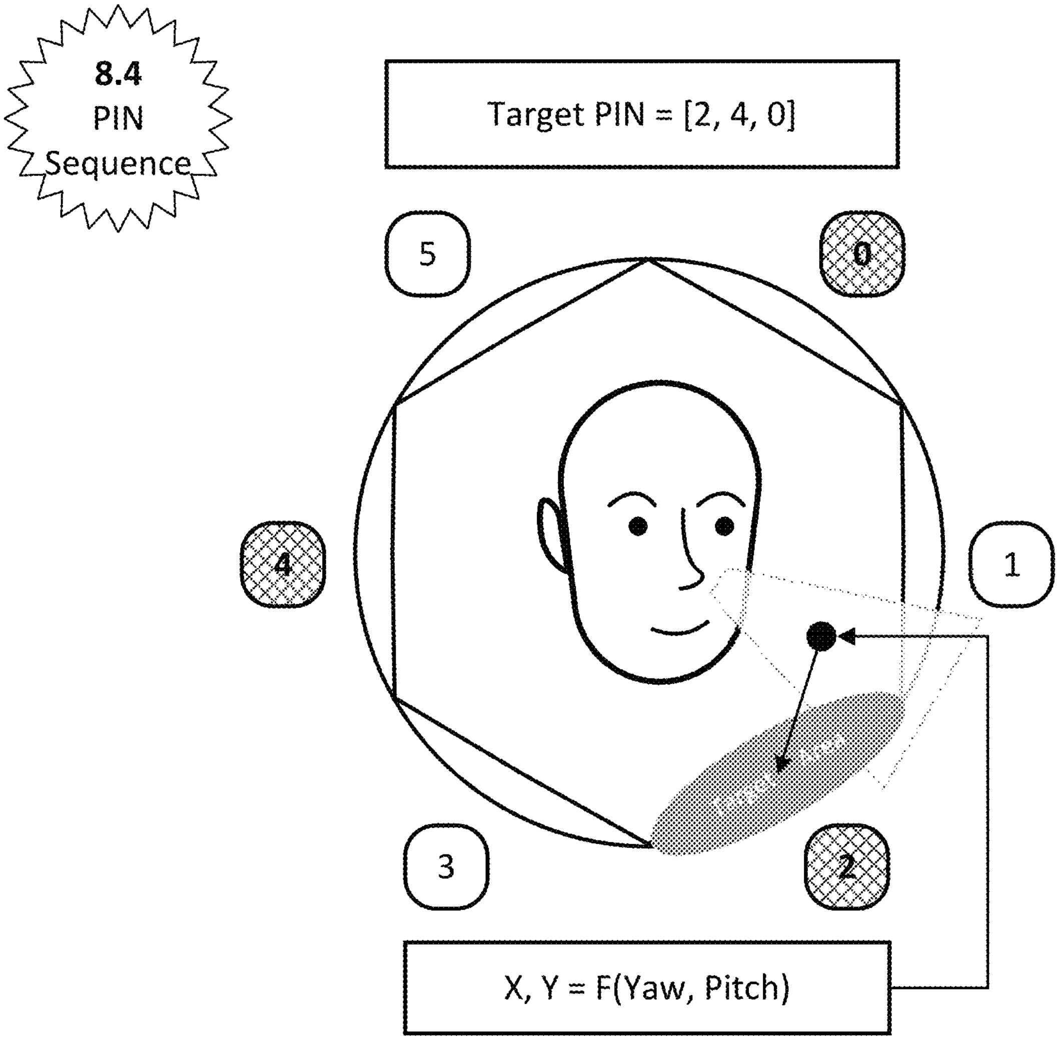
FIG. 8.4

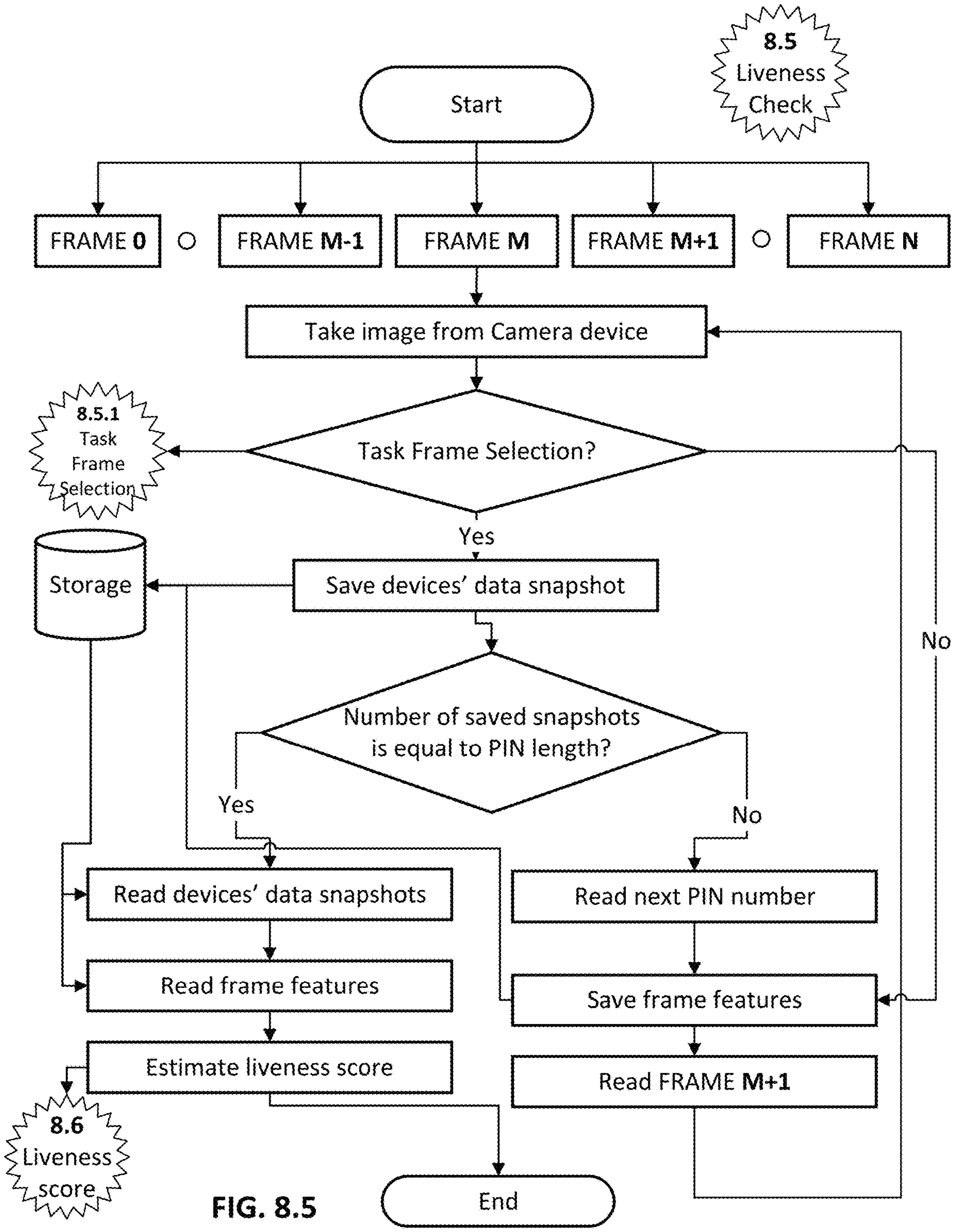
FIG. 8.5

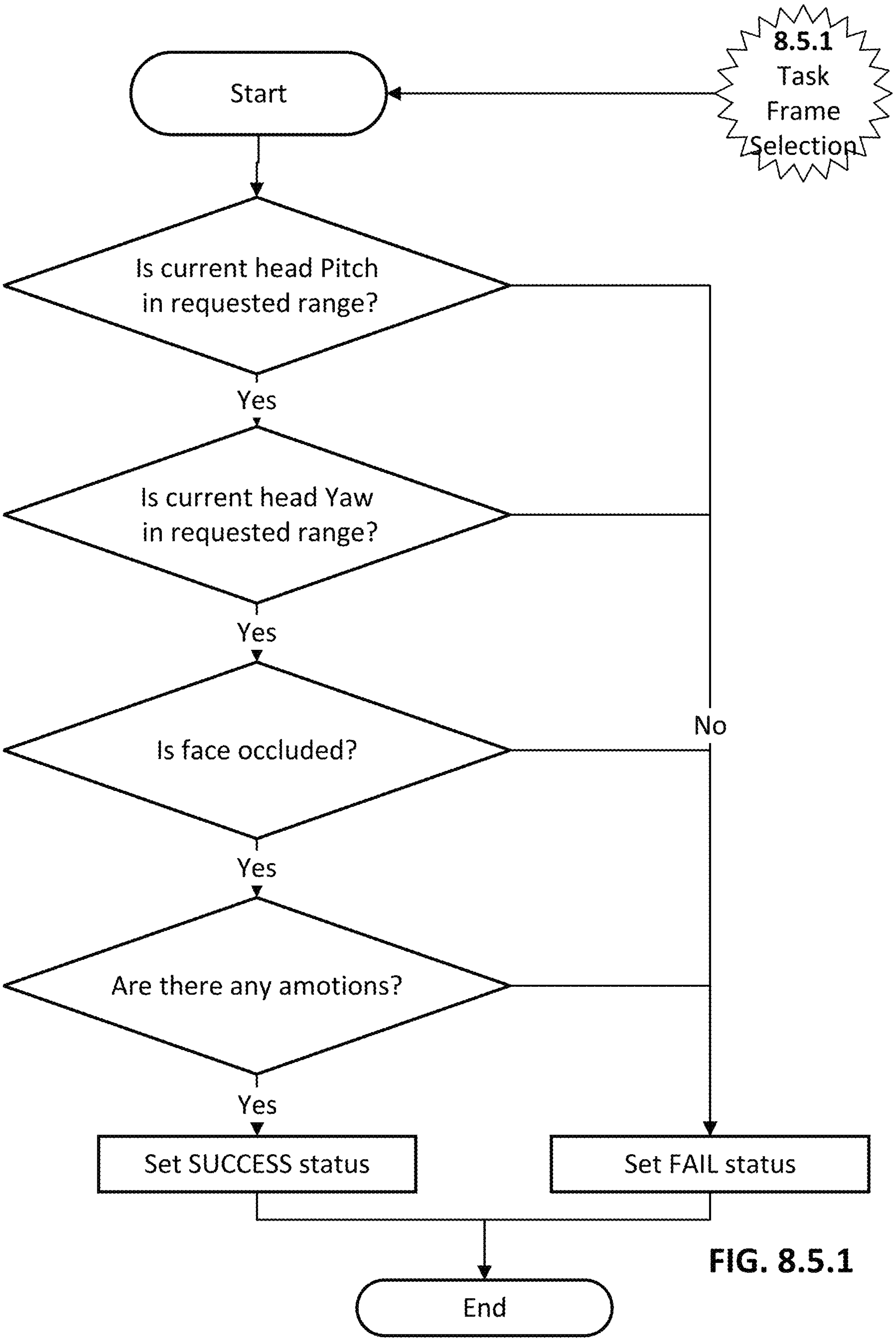
FIG. 8.5.1

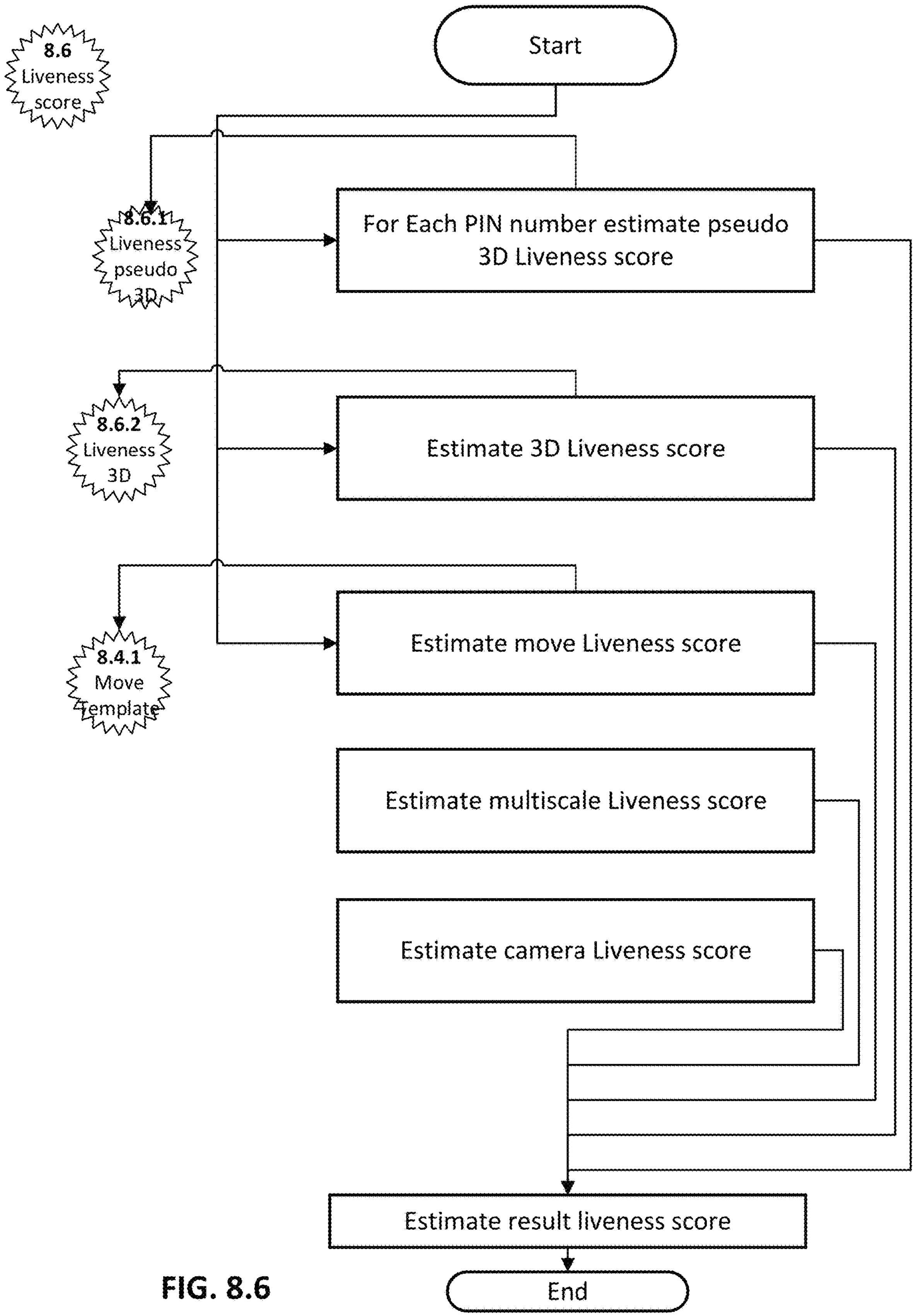
FIG. 8.6

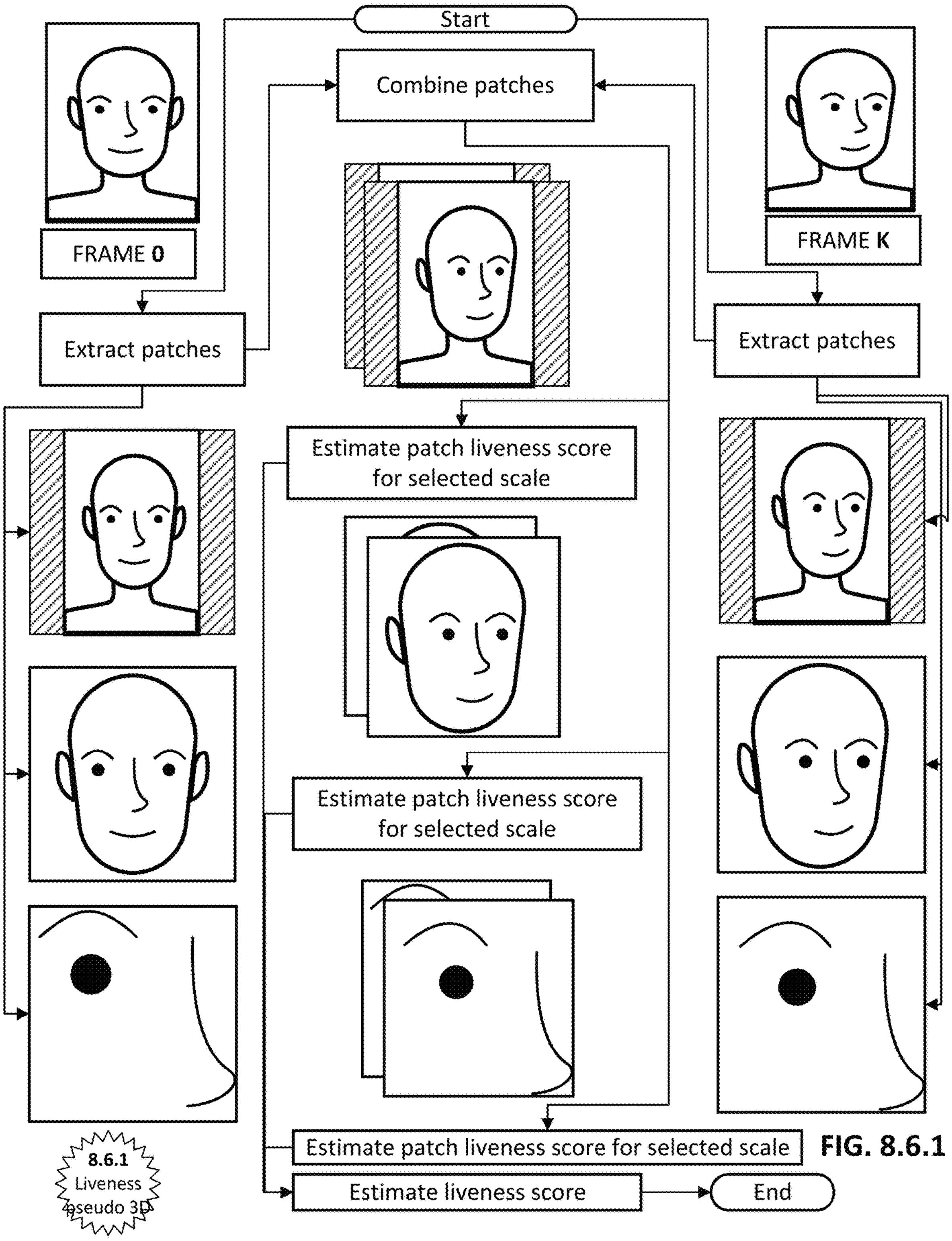
FIG. 8.6.1

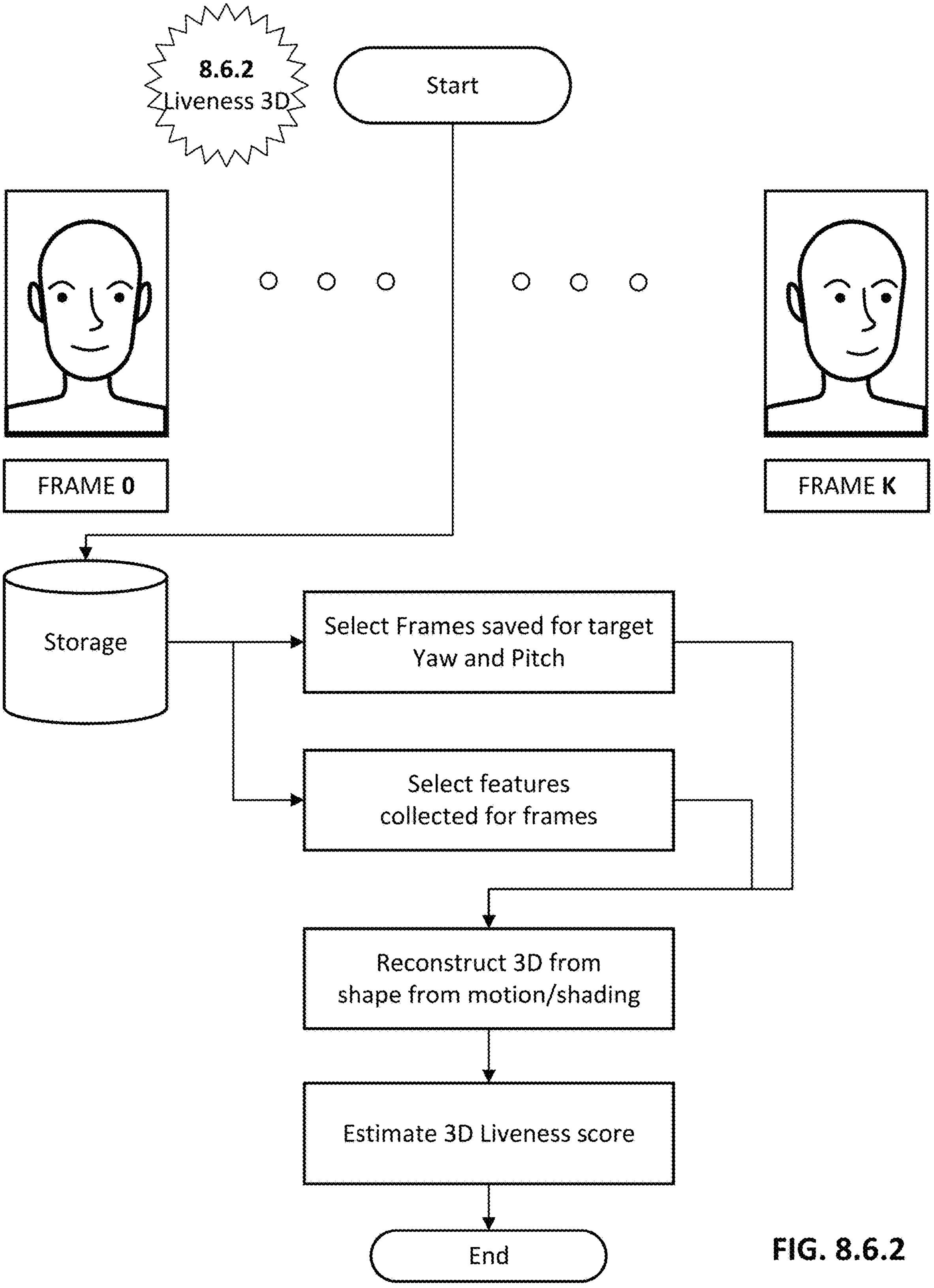
FIG. 8.6.2

SYSTEM AND METHOD FOR DETERMINING LIVENESS USING FACE ROTATION

CROSS REFERENCE TO RELATED APPLICATIONS

This application is a non-provisional of U.S. Provisional Patent Application No. 63/529,700, filed Jul. 29, 2023, which is incorporated herein by reference in its entirety.

BACKGROUND OF THE INVENTION

Field of the Invention

The invention relates to determining that a face presented for identification is a live face, rather than a photograph or some other form of fake object.

Background of the Related Art

Liveness verification is an important step in face recognition pipelines. Namely, there is no sense to identify the person during the authentication without knowing his 'liveness' status. There are a number of liveness verification procedures including fingerprint, iris, multiple camera, additional light sources, and so on. Some of them required additional and sometimes complex devices to verify the person's liveness. Generally, it is desirable to perform the liveness verification procedure with the simplest toolset mobile phone or PC with web camera. As such, the only available data source in such configuration is the single camera (and some onboard devices in case of a mobile phone). The source of the liveness verification data is the human face.

What can be done with the camera is to collect a single or number of frames and make a decision based on them. Conventional methods for doing such kind of classification (live/not live) from number of frames are Machine Learning (ML) methods (the most powerful of them are neural networks and decision trees). So, in theory it is possible to collect the whole video sequence and feed it into the ML classifier. In other words, it is possible to do a simple sequence classification task. But in practice this approach is hardly applicable.

The problems with the conventional approach are as follows:

1) The greater resolution of the input camera, the better decision available as well as the more resources are required to do the classification task (run neural network for example).
2) Another problem is the impossibility to transfer the entire set of data without lossless compression to the server to do classification outside of the client's device. One should pass the all video frames of, for example, 10 seconds of video to server in raw format (10 seconds times 30 FPS times 720 height times 1280 width time 3 RGB channels ~791 MB)
3) The greater the input resolution, the more data should be collected to train a good classification model.

Accordingly, there is a need in the art for more robust liveness detections systems that address the above problems.

SUMMARY OF INVENTION

In one aspect, there is provided a method of 3D face shape verification, including verifying that user is positioned in a frontal (so called "standard") orientation so that head rotation angles are small; capturing an image of the user's head at the first position; generating a PIN and transmit it to a user device; upon receipt of the PIN, instructing the user to rotate his head to a first position indicated by the PIN and a corresponding graphic; repeating instructions to the user to rotate his head for all remaining values of the PIN, and capturing images of the user's head at positions corresponding to the remaining values of the PIN; transforming yaw and pitch angles of the user's head in the captured images into a graph in polar coordinates; transforming the graph into a phase map; sending the phase map into a machine learning classifier; and determining, using the machine learning classifier, whether the user's head is a live 3D face or a different object.

In another aspect, there is provided a method of 3D face shape verification, including verifying that a user is positioned in front of a user device so that head rotation angles are no more than 10 degrees; capturing an image of the user's head at an initial position; generating a PIN and transmitting it to the user device; upon receipt of the PIN, instructing the user to rotate his head to a first position indicated by the PIN and a corresponding graphic; capturing an image of the user's head at the first position; repeating instructions to the user to rotate his head for all remaining values of the PIN, and capturing images of the user's head at positions corresponding to the remaining values of the PIN; transforming yaw and pitch angles of the user's head in all the captured images into a graph in polar coordinates; transforming the graph into a phase map; sending the phase map into a classifier; determining, using the classifier, whether the user's head is a live 3D face or a different object; and outputting a result of the determination.

Optionally, the classifier is a neural network classifier. Optionally, the classifier is split between a server and the user's device. Optionally, the classifier runs on a server. Optionally, the determining step is performed on a server. Optionally, the determining step includes selecting positions of face features and transforming their coordinates into the graph.

Optionally, the determining includes estimating a liveness score according to selecting an image with a best score; predicting regions of the image to be analyzed; and computing a liveness score of individual frame patch. Optionally, the estimating includes collecting at least two subsequent images; for each collected image, estimating a single-image liveness score; and for each pair of images, estimating a multiple-image liveness score. Optionally, the estimating a liveness score includes detection of objects of well-known sizes within the images; for cameras with ID, solving an optimization problem with facial feature mean size regularization and sizes of identified objects with respect to camera calibration matrix and size of face feature. Optionally, the method further includes sending derivatives of the regions to the server when sending the regions to the server.

In another aspect, there is provided a method of 3D face shape verification via motion history images, the method including verifying that a user is positioned in front of a user device so that head rotating angles are no more than 10 degrees; capturing an image of the user's head at an initial position; generating a PIN and transmit it to a user device; upon receipt of the PIN, instructing the user to rotate his head to a first position indicated by the PIN and a corresponding graphic; repeating instructions to the user to rotate his head for all remaining values of the PIN, and capturing images of the user's head at positions corresponding to the remaining values of the PIN; selecting positions of face features and transforming coordinates of the positions into a graph in polar coordinates; transforming the graph into a phase map; sending the phase map into a classifier; determining, using the classifier, whether the user's head is a live 3D face or a different object; and outputting a result of the determining.

In another aspect, there is provided a method of single frame liveness verification via multi-scale 2D features classification check, the method including configuring all available cameras of a user device for taking raw images of a user's head and scene sufficient for 3D liveness analysis; prompting the user to fit the user's head into a defined area of the captured raw images; computing quality for each raw image; selecting a raw image with a best score; predicting regions of the image with a best score to be analyzed; computing a liveness score of each region; sending the regions to a server; on the server, computing the liveness score for each available camera and for each region when other device cameras are available; computing overall liveness score based on the liveness scores for each available camera; and outputting the overall liveness score.

Optionally, the method further includes sending derivatives of the regions to the server when sending the regions to the server.

In another aspect, there is provided a method of multiple frame liveness verification via multiple scale texture and multi-frame liveness check, the method including configuring a camera of a user's device or configuring multiple cameras of the user's device; prompting user to fit the head and body to standard orientation (like a passport photo); computing frame quality for the each according to a face quality estimation standard; collecting at least two subsequent (or different frames) with sufficient quality; sending frames (or their derivatives) to the server; for each collected frame, estimating a single frame liveness score; for each pair of frames, estimating a multiple frame liveness score; if more than one camera is available computing the liveness score for each camera; and computing overall liveness score.

In another aspect, there is provided a method of multiple frame liveness verification via multiple scale texture and multi frame liveness check with PIN pass verification, the method including configuring a camera of a user's device or configuring multiple cameras of the user's device; prompting a user to fit his head and body to a standard orientation (like a passport photo); capturing frames of the user; generating a PIN and transmitting the PIN to the user device; upon receipt of the PIN, instructing the user to rotate his head to a first position indicated by the PIN and a corresponding graphic; capturing an image of the user's head at the first position; repeating instructions to the user to rotate his head for all remaining values of the PIN, and capturing images of the user's head at positions corresponding to the remaining values of the PIN; estimating a liveness score; recovering a 3D shape of the user's head and estimating liveness from the 3D shape; and computing overall liveness score.

Optionally, the estimating a liveness score includes transforming yaw and pitch angles of the user's head in the captured images into a graph in polar coordinates; transforming the graph into a phase map; sending the phase map into a ML (machine learning) classifier; and determining, using the neural network ML classifier, whether the user's head is a live 3D face or a different object. Optionally, the estimating a liveness score includes selecting face features positions and transforming their coordinates into a graph in polar coordinates; transforming the graph into a phase map; sending the phase map into a neural network classifier; and determining, using the neural network classifier, whether the user's head is a live 3D face or a different object.

Optionally, the estimating a liveness score includes selecting a frame with a best score; predicting (or selecting predefined) the regions of frame to be analyzed; computing a liveness score of individual frame patch.

Optionally, the estimating a liveness score includes collecting at least two subsequent (or different frames) with sufficient quality; for each collected frame, estimating a single frame liveness score; for each pair of frames, estimating a multiple frame liveness score.

In another aspect, there is provided a method of multiple frame liveness verification via multiple scale texture and multi frame liveness check with PIN pass verification, the method including configuring a camera of a user's device or configuring multiple cameras of the user's device; prompting a user to fit his head and body to a standard orientation (like a passport photo); capturing frames of the user; generating a PIN and transmitting the PIN to the user device; upon receipt of the PIN, instructing the user to rotate his head to a first position indicated by the PIN and a corresponding graphic; repeating instructions to the user to rotate his head for all remaining values of the PIN; using a ML (machine learning) classifier to select most representative frames of the captured frames; sending frames (or their derivatives) to the server; estimating a liveness score based on the selected most representative frames, for each such frame; recovering 3D shape of the user's head and estimating liveness for the 3D shape; and computing overall liveness score based on the liveness scores for the each such frame and on the liveness for the 3D shape.

The method of claim 11, wherein the estimating a liveness score includes recovering 3D shape of the user's head and estimating liveness for the 3D shape based on camera calibration information and estimating liveness for the 3D shape; estimating liveness score based on correspondence camera information (camera type) and camera type estimated from the frame; computing overall liveness score based on the liveness scores for the each such frame and on the liveness for the 3D shape.

In another aspect, there is provided a privacy aware liveness (spoof) detection method by splitting decision making algorithms between clients and servers, including capturing single or multiple frames from camera at a first (client) device; process captured frames by part of decision-making algorithm at client's device; send features from client device to server device; and make final decision at server or send server computation result to other server (or third-party application) for final decision.

In another aspect, there is provided a method of camera calibration from multiple liveness session of distinct persons, the method including collecting multiple liveness sessions of distinct people; collect camera (or device) information for each liveness session with assignment device ID to each device; filter the frames according to quality; perform face detection task with result of face detection; perform face recognition (namely clusterization, as one example) with assignment ID to each person; filter the frames with respect the variation of head rotation angles; group frames by pair [person ID, camera ID]; for camera with ID solve optimization problem with facial feature mean size regularization with respect to camera calibration matrix and size of face feature.

Optionally, the estimating a liveness score includes detection of objects of well-known sizes within the images; for cameras with ID, solving an optimization problem with facial feature mean size regularization and sizes of identified objects with respect to camera calibration matrix and size of face feature.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6A illustrates a sequence involving a live person.

FIG. 6B illustrates an attempt to spoof system by repeating head rotation.

FIG. 6C illustrates an attempt to spoof system by repeating sector-center head rotation.

FIG. 6D illustrates an attempt to spoof system by a printed face image.

FIG. 8.1, FIG. 8.2, FIG. 8.3, FIG. 8.3.1, FIG. 8.3.2, FIG. 8.4, FIG. 8.5, FIG. 8.5.1, FIG. 8.6, FIG. 8.6.1, and FIG. 8.6.2 should be viewed as a single figure, and collectively illustrate various aspects of the liveness detection algorithm.

Figure 9:
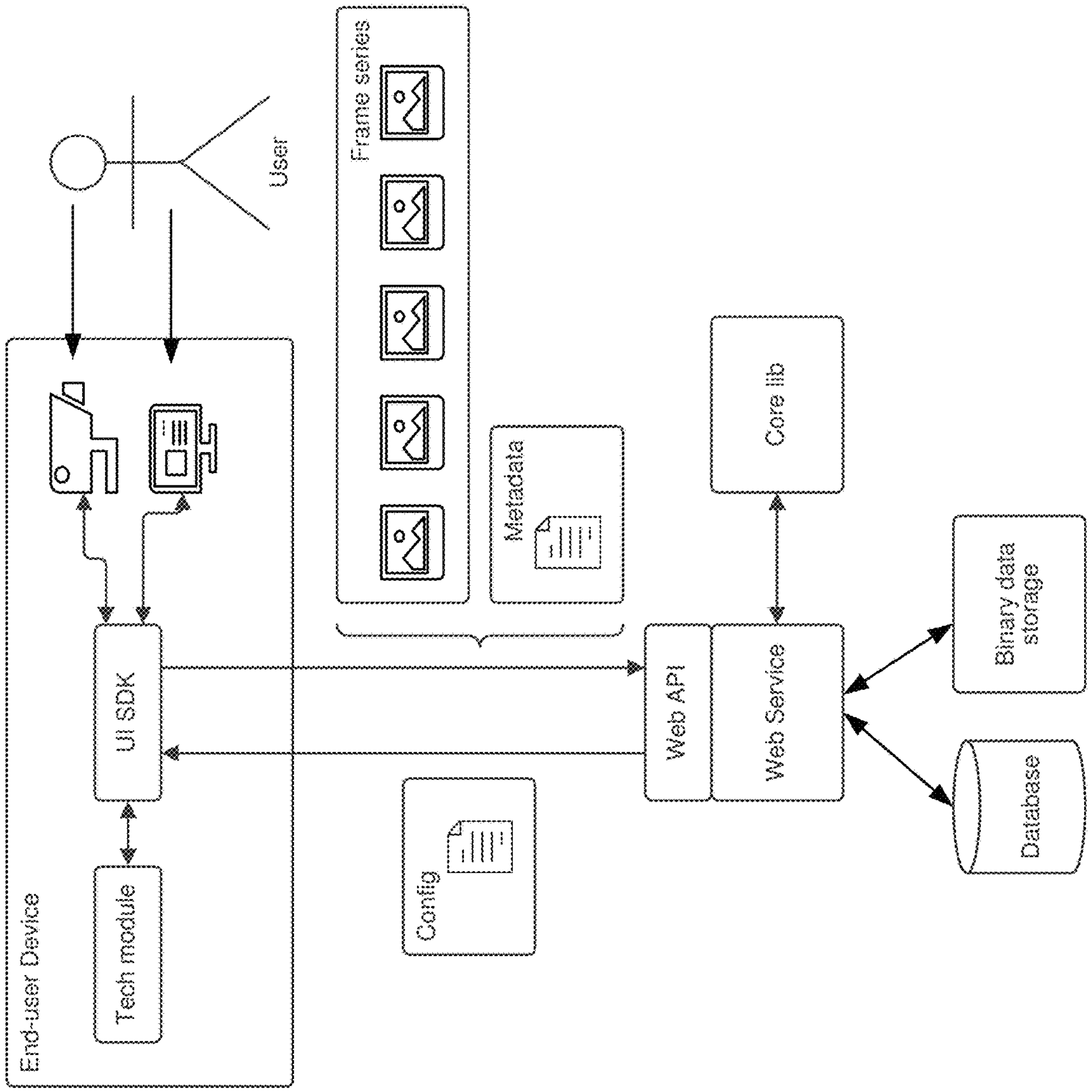

FIG. 9 shows a system architecture for liveness detection.

Figure 10:
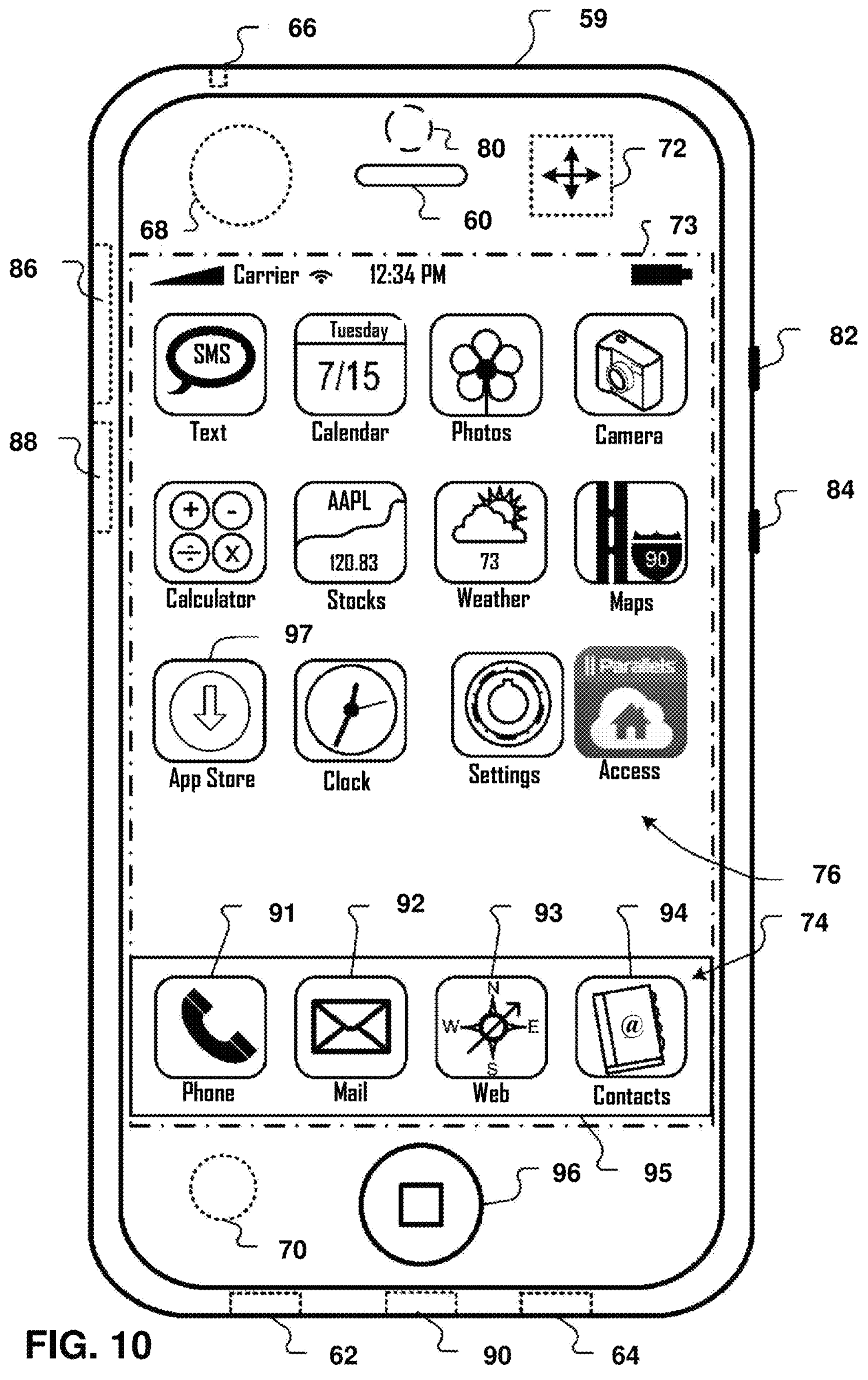

FIG. 10 is a block diagram of an exemplary mobile device that can be used in the invention.

Figure 11:
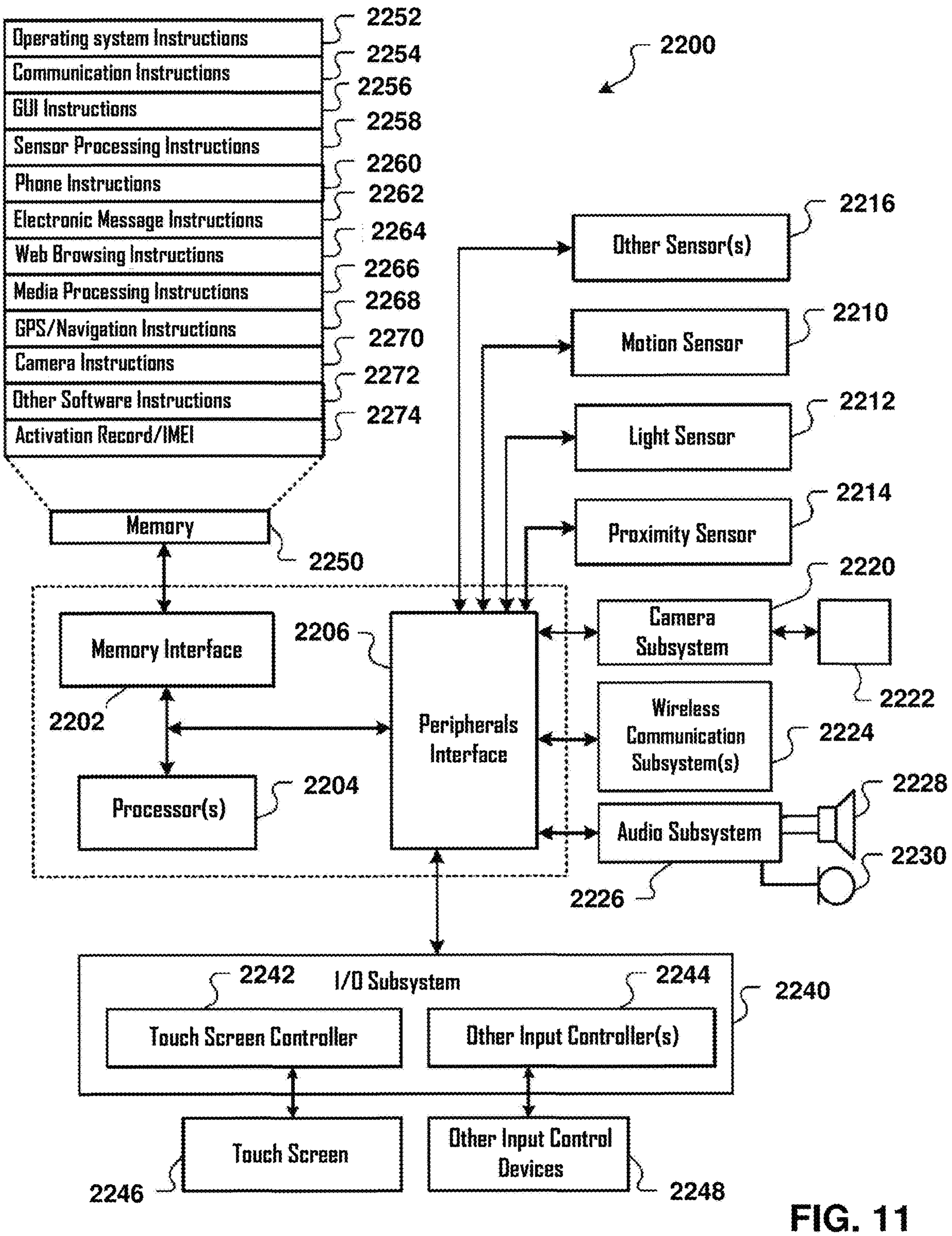

FIG. 11 is a block diagram of an exemplary implementation of the mobile device.

DETAILED DESCRIPTION OF EMBODIMENTS OF THE INVENTION

Reference will now be made in detail to the preferred embodiments of the present invention, examples of which are illustrated in the accompanying drawings.

As used in the text below, the terms "frame" and "image" are used interchangeably.

The verification process can be divided into scales and steps.

Possible Scales:

The first scale is the full frame scale-like a selfie.

The second scale is the face scale—the sub-image of face box size.

The third scale is the face feature scale (the sub-image of eye (nose, lip, ear and so on) box size.

Over all the scales, a number of similar verification steps should be performed. These steps are:

1. Replay attack verification
2. 3D verification
3. Texture verification

Figure 1:
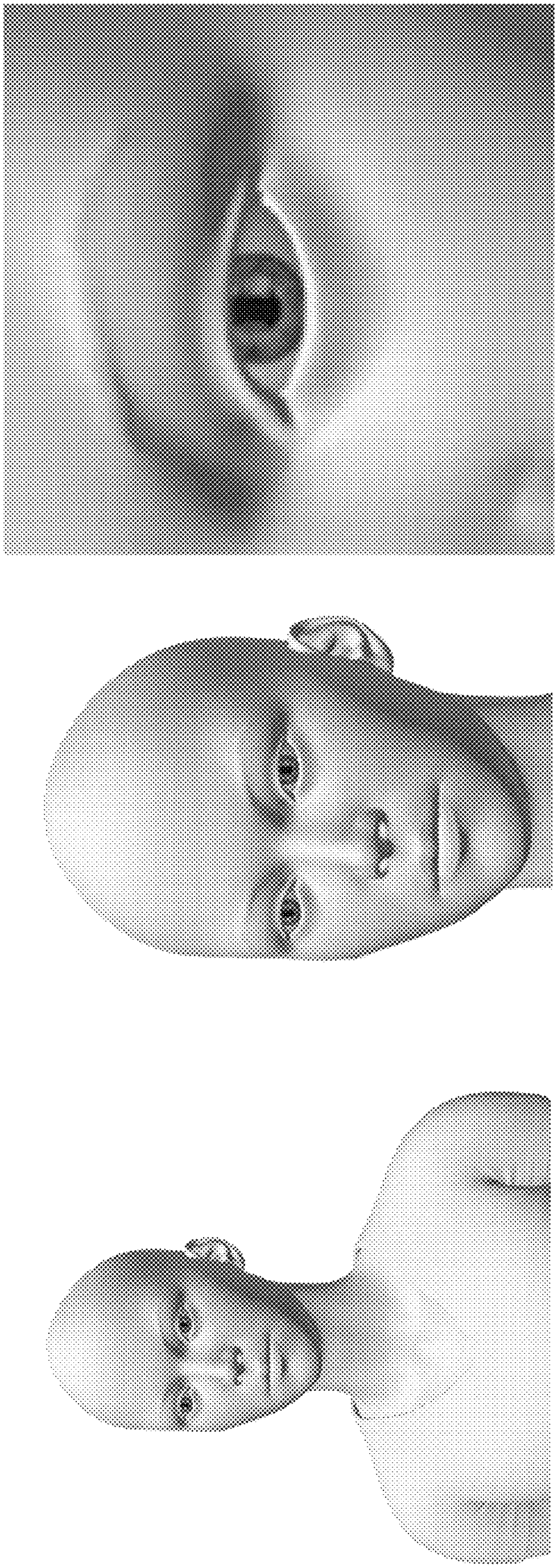
FIG. 1 shows possible variants of scaling.

All these steps can be performed in a similar manner. Having the original frame the following steps can be performed:

1. Prepare all scales (see possible variants in FIG. 1, for more discussion of this aspect, see FIG. 8.6.1 and related discussion)
2. Perform replay attack verification (see section 1)
3. Perform texture verification (see section 2)
4. Perform 3D verification (see section 3)
5. Make a liveness decision (section 4)

1. Overall Process

Figure 2:
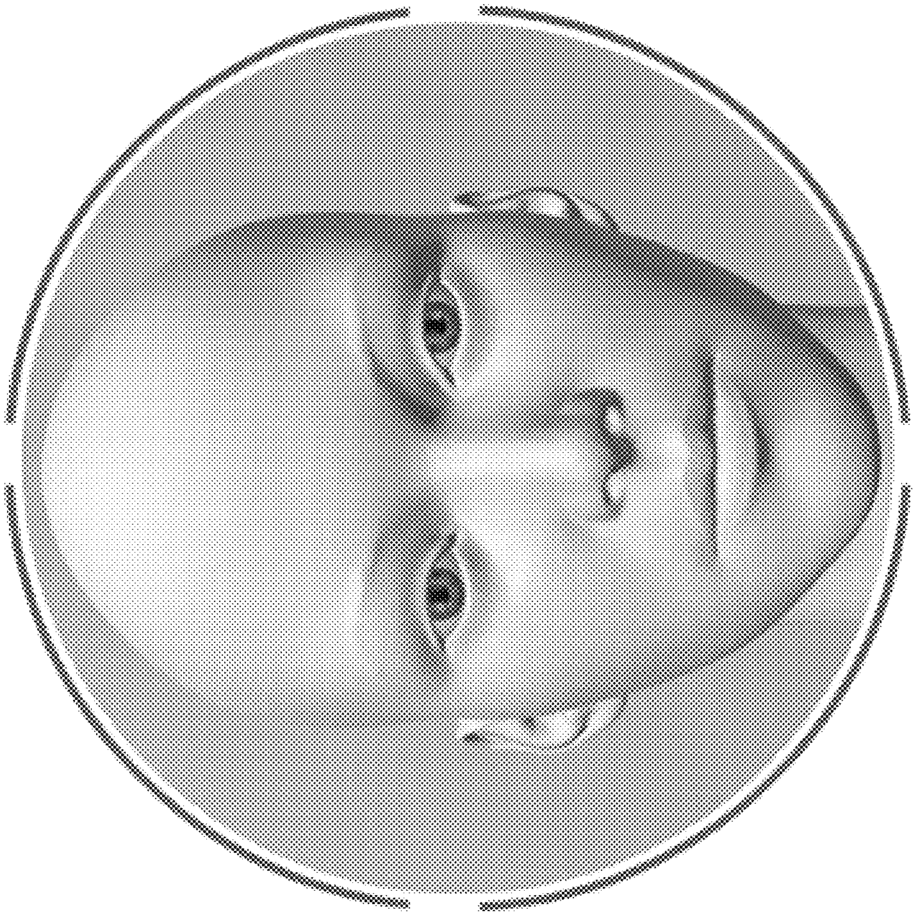
FIG. 2 shows a central face position.
Figure 3:
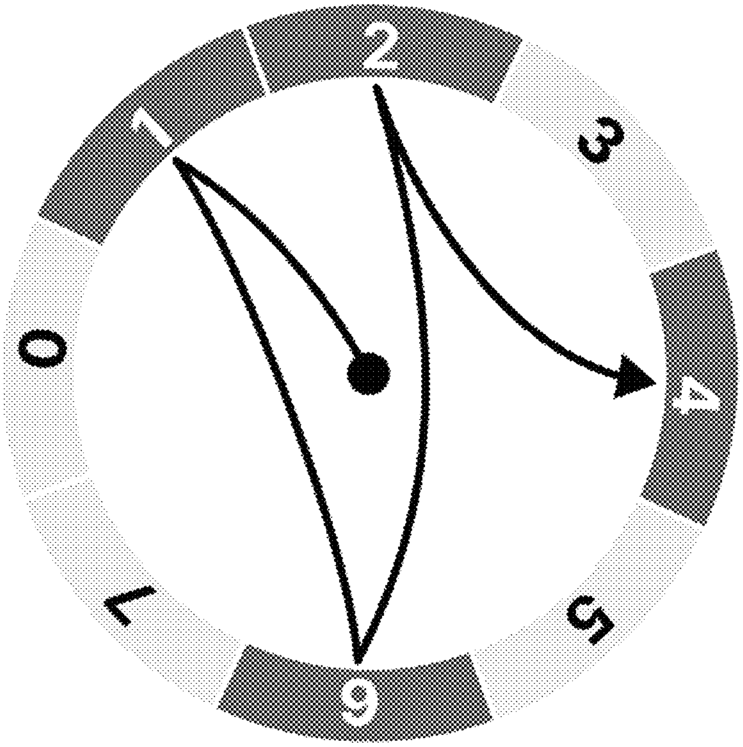
FIG. 3 shows a PIN sequence [1, 6, 2, 4].
Figure 4:
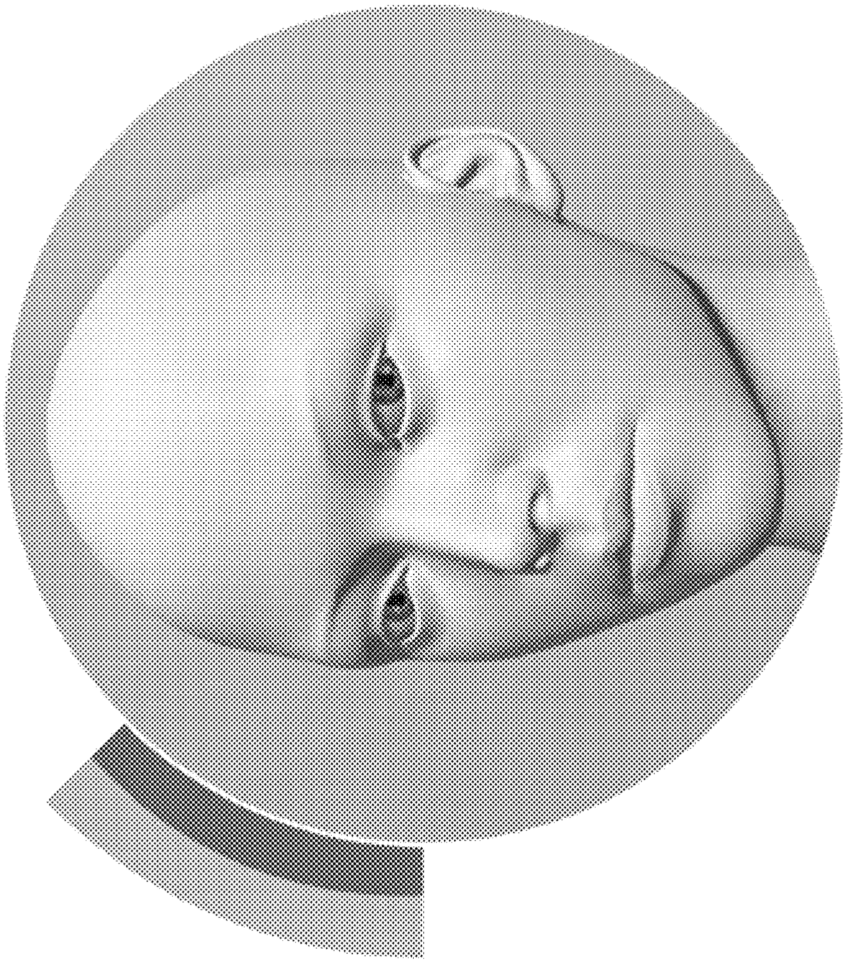
FIG. 4 shows a certain PIN item face position.
Figure 5:
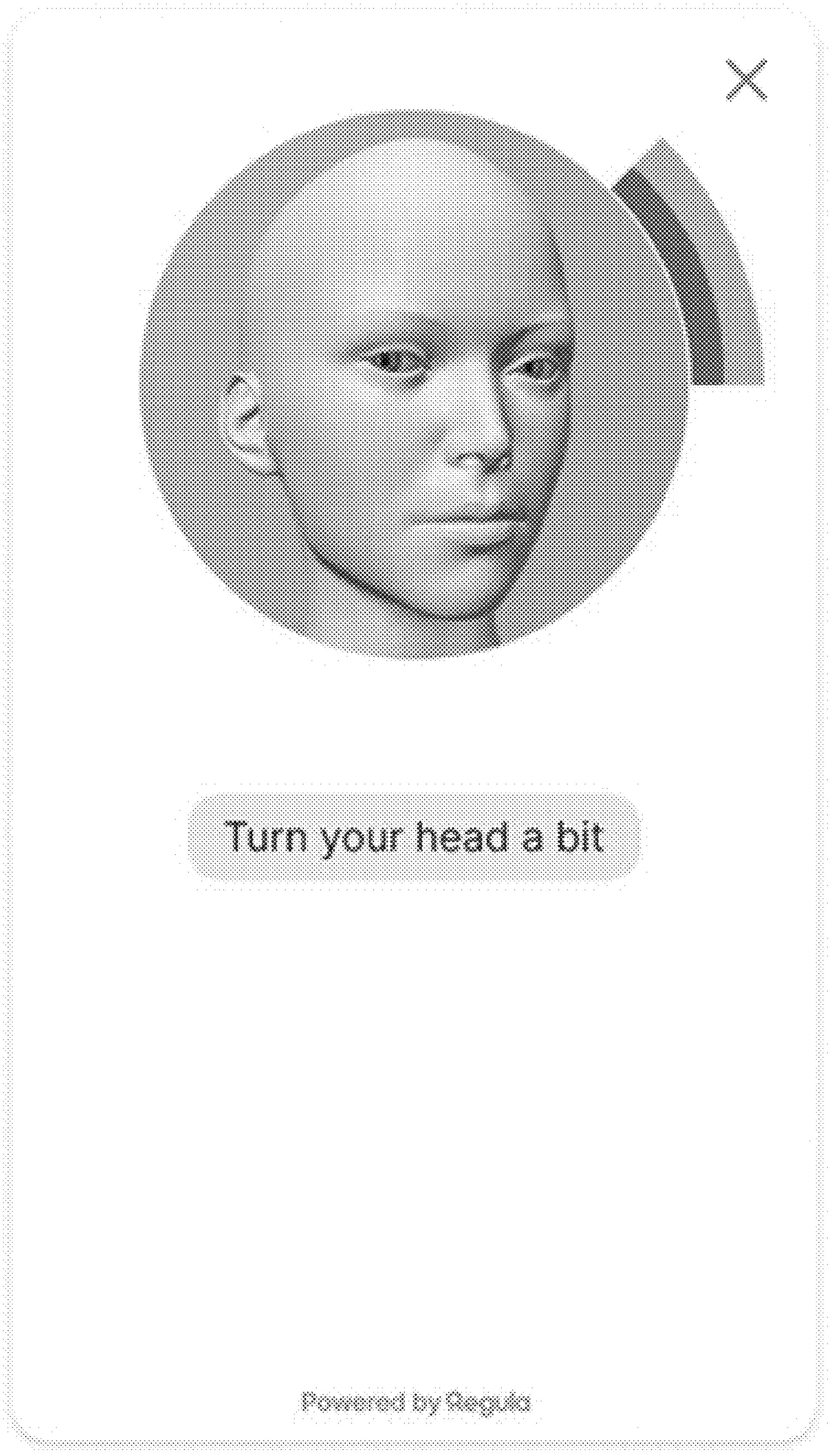
FIG. 5 shows the user application in action.

The data from all steps are collected in gamification style. Namely the person is prompted to put the face into a certain position of the screen and rotate the face to distinct yaw and pitch angles. FIG. 2 shows a central face position, and FIG. 3 shows PIN sequence [1, 6, 2, 4]. FIG. 4 then shows a certain PIN item face position (e.g., position 6), and FIG. 5 shows the user application in action.

The goal of performing the initial sequence of action is to get a frame with centered user face, set at specific distance from the camera and oriented strictly from the front. This step is important because the face from this frame will be used in subsequent face recognition. As soon as the presented frame is verified as "live", this frame can be directly used for the person's identification via face recognition. In alternative scenarios (when liveness and recognitions tasks are disjointed in sense of data flow), a number of additional verifications would be required to ensure that both verification stages (liveness and recognition) are passed by same individual.

To do that, the user is asked to fit his face into a drawn shape (e.g. circle, oval, rectangle) on the user's device screen and to look straight at the camera. The face position on the device screen and the face orientation angles (pitch and yaw) are estimated by specific ML/CV (machine learning/computer vision) algorithms on each frame (see section 1.4 below).

As soon as user successfully positions his face on a predefined location on the screen:

1. The client application sends the data (see section 4 below) to the server and then requests a PIN (see 1.2) sequence for user action to perform. The PIN sequence can be requested at once or one by one action as soon as previous action is performed
2. Convert the PIN sequence to the actions (head rotation to distinct angle-see section 1.3 below)
3. Waiting user to perform this action (rotate head from current position to requested one)
4. As soon as the user successfully performs the action, the client application sends data (see section 4) to the server and waits to perform the next action (head rotation to next position according to the PIN sequence)
5. As soon as all angles position are matched the whole video sequence undergoes the number of verification stages. Here we should note that it is unnecessary to store all frames of a session on a file system or write to a video stream. The necessary "key frames" and features extracted from them are stored in memory to be used further in verification stages. Additionally, ML (machine learning) features from various classification, detection and segmentation steps can be stored from various frames and analyzed to get better confidence of the verification result.
6. As soon as the last PIN action is performed, the client application gets the liveness status from the server or order server to process the result in other way (pass the result to third party server/application and so on).

1.1 Session Identification Check

The process of liveness classification has several steps to make the decision. Initially the server-side application generated the PIN and the Session ID. The both values are stored into the database and sent to the client (Web, Mobile, Desktop application). According to the PIN the user performs the request by PIN action. The client application collects the necessary data to make the decision and sends it back to the server with Session ID information. On request from client the server side application requests the PIN information from the data and estimates the probability of liveness based on client data. The mismatch between the positions of head on the frames obtained from client and PIN sequence stored in the database is treated as a false liveness response.

1.2 Server-Side Unique PIN Generation.

Unique PIN is a sequence of 4 (can be from 1 to any other value) digits from 0 to 9. The first digit $d_1$ is generated randomly in the range from 0 to 9. The every next digit $d_n$ (n from 2 to 4) is generated according to following rule:

1. Generate random value b from 3 to 7 inclusively
2. Add value b to previous digit: $d_n=d_{n-1}+b$
3. If digit $d_n>9$, subtract 10 from $d_n$: $d_n=d_n-10$
4. If digit $d_n$ equals any of previous digits from $d_1$ to $d_{n-1}$, regenerate it, starting from point 1.

The pin generation scheme can be configured for longer PIN length and more unique states or actions. For example, PIN length can be 5 and the action set can also include face gestures and occlusion actions (occluding face by hand).

1.3 Transforming the PIN into the Main Sequence of Action to Perform (See FIG. 2-FIG. 3).

The goal of performing the main sequence of action is to get the set of frames with the user face, rotated in different sides, which will be used further in checking the 3D of the human face shape.

There are 4-10 desirable face orientations (pitch and yaw face angles), that may be evenly or irregularly distributed on the angular cone with a 12-15° angle offset from the camera optical axis. Each digit in the PIN sequence corresponds to one of these face orientations. The reason of the irregular pitch and yaw distribution is dictated by the optimal face positions for subsequent 3D face restoration algorithm.

The main sequence of action to perform is consequent head rotation to match the desirable face orientations, which are set by corresponding digits da from the PIN sequence. When actual face orientation matches the desirable one, the frame with the user face is taken for further use in checking the 3D of the human face shape.

1.4 Key Frame Extraction for Verification Tasks.

Initial frame (frontal face, with small values of head rotation angles) is estimated for the face quality according to the ICAO standard [3] with configuration adopted to the single frame liveness verification (so called one-shot-liveness) and face recognition tasks. The best frame (in the sense of face quality score) is stored in the device memory (i.e., is sent to the server), see FIG. 8.3.1. The strict standard requirements can be relaxed depending on the specific application of the system. The ICAO standard specifies the requirements for face recognition applications. Namely, it specifies scene constraints and photographic properties of facial images. These requirements are usually met when a person's face image is taken for an identity document (digital or printed). In brief, the facial photo should be taken: within a bright uniform background, with sufficiently uniform white illumination of the non-occluded face, the person should look straight ahead and Euler's head angles should be less than 5 degrees, the image resolution and the face position should be adjusted to yield inter-eyes distance of about 112 pixels, and defocusing and blur-like effects withing the face image patch are not allowed. These requirements are quite strong, if one were to satisfy them with practical business applications. The reason for this is the variety of scene conditions and device types requiring liveness verification and subsequent face recognition task. Thus, some requirements can be omitted (background uniformity, headphones, car pods, glasses, regional head dresses and small hats presence, not expressive emotions), some of such requirements can be relaxed by reducing acceptance threshold (human body pose, camera/head roll angle, imperfection of color and uniformity of face illumination, glares within human face and glasses), while other requirements should be kept as it is (face occlusion, expressive face gesture/emotions, multiple face presence, blur-like and noise-like effects). For estimation quality of rotated face, yaw and pitch angle check should be omitted as well.

As soon as the frontal face is captured, the user is prompted to rotate the head according to the PIN number. At every frame during the head rotation the face quality is estimated in sense of 3D shape reconstruction. For each frame the quality score is estimated FIG. 8.3.2. The best frames are stored in the device memory (are sent to the server). To save network traffic as well as memory use by the features from ML (machine learning) feature extractors used for the face quality, estimates are only saved (are sent to the server) or used for the face 3D shape reconstruction at client device. During the typical verification session of 4-8 seconds, it is possible to capture 10-30 distinct frames with the necessary quality.

The frame (with face) quality score can be derived from ICAO standard, for example, as a simple (weighted) averaging.

The frame (with face) quality score can be obtained from human perception. The number of humans can be asked to examine the ICAO standard and annotate number of frames for accepting or declining for further face recognition and liveness verification.

Having a number of algorithmically and/or perceptually annotated frames the frame/face quality task can be approximated by appropriate machine learning algorithms (ANN, for example). This allows to run such an algorithm in real-time at 10-30 frames per second on client's platform (mobile device, web browser and so on). Having real-time frame/face quality estimation, one can select the frames of desirable quality, thereby allowing to get high confidence result from decision making algorithms.

2. Replay Attack Verification

One of the ways to spoof the liveness detector is to prepare a video sequence that can perform the same action as requested. For example, a liveness detector making decisions by means of emotion (smile, mouth open and other) action can be easily prepared in advance. Nowadays, this can be achieved by a simple frame switch on a display or by a deep fake technique. As soon as the next action is unknown, the spoofing system should be more confident to follow the requested server action. Meanwhile there are a number of sequences allowing passing the replay attack verification algorithm based on simple angle magnitude check. For example, showing all frames corresponding to all PIN numbers can pass the simple verification algorithms based on angle magnitude. Utilizing ML/ANN algorithms as anomaly detection one guarantees the desirable accuracy to distinguish Fake/True sequences. According to the internal tests the analyzing the transition sequences can protect the system to accept:

1. Switching frames with face of distinct rotation angles
2. Switching small sequences with face rotation from center to sector and backward 3. Random/pseudo-random head movement
4. Printed face on paper with twisting
5. Simple Deep Fake sequences Instead of using the time series classification, an equivalent phase map is introduced to achieve the same result. According to traditional notation of phase map of dynamical system, the time is eliminated from consideration, same as it may be done for various physical and mathematical dynamical systems (for example, physical or mathematical pendulum phase map, Lorenz system phase map, etc.). The difference from traditional phase map is that we keep the time information by indicating the motion direction by means of a color value of dots. FIGS. 6A-6D show visualization of the True and Fake PIN sequence passing. Each dot corresponds to a frame, the connection lines indicate to frame to frame transition. All figures demonstrate the scheme and generated phase map used for the image classification task. Namely the time sequence is rendered into the image to be classified instead of using sequence classification approach. FIG. 6A shows a Live face. FIG. 6B shows a fake with attempt to spoof by head rotation clockwise to all available PIN states. FIG. 6C shows a fake by random head rotation. FIG. 6D shows a fake-here, an attempt to fool the system by using a printed photo. The approach of using 2D phase map motion (similar to the motion history image) shows its effectiveness over using time series approach. As FIGS. 6A-6D show, even yaw-pitch phase map produces features to distinguish the 3D face from other 2D/3D objects. As experiments demonstrate, the results are significantly improved by using the motion history images for the face patches or set facial landmarks.

3. Perform Texture Verification

As described above, the texture check is performed on different scales. Namely, face detector algorithm analyzes whole frame and returns information about the face locations (face bounding box, face landmarks, angles of head rotation). Subsequent algorithm steps extract the face patch as well as patches of distinct facial features (eye, nose, lip and so on) and prepares them to feed them in to classification/scoring algorithm at certain patch scale adopted to inference time (the greater patch, the more floating point operations should be performed to get the answer). Various Machine Learning (ML) techniques can be used for this task, but Artificial Neural Network (ANN) is a preferable one, since it does not require tedious feature engineering task. Additionally, for high resolution images, a downscale face patch to feed into the classification algorithms can lead to aliasing artifacts. For this reason, other facial features are also subject of classification because upscaling does not lead to such effects. The exact sizes of face and face features can be predefined by means of result of face detector as well as predicted by other machine learning algorithm. All these patches from different scales are fed to a single or multiple classification algorithms. The classification algorithm gives probability of sequence liveness. This approach gives the possibility to make decision based on presence of distinct textures:

1. Dolls (face proportion is different from human one), silicone masks (skin texture is different from expected), monuments (skin color does not match), prints and so on.
2. Presence of more noise (due to the interference of display and camera sensor grids), parts of electronic devices, clearly visible pixels of camera sensor and so on.
3. Deep fake artifacts (imperfections of deepfake algorithms result in characteristic artifacts depending on the generator).

To achieve a good quality model, an active learning approach is utilized. The texture model evaluates in accordance with state of the art deep fake generation approaches. The textures are verified at different scales to be able to catch all possible features of live/fake examples. Moreover, the information about the camera is also available for ML classifiers. The advantage of this approach is creation of additional feature space to distinguish similar features in images obtained from different cameras.

4. Performing 3D Verification

By 3D verification, it is implied that the 3D shape is the selfie 3D object (the neck can rotate the head), the face has 3D shape of all variations of humans, the face patches are the variations of human face patches. In other words, 3D verification is performed on different scales. The 3D verification algorithm looks like an extension optical flow verification procedure described in [1,2] but extended by texture images. As described in references [1,2] the only optical flow is used to make 3D face shape verification. Here, the algorithm is improved by following:

1. The decision algorithm makes a decision based on frame pairs or multiple frames obtained at various Euler angles of the human head. The optical flow, motion history images, infrared images, depth sensor images (and other images if available) are subject to performing 3D verification on them.
2. The decision algorithm takes full frame, face patch, face features patches, background patches and other patches from original frame from all available sensors to get a 3D verification score.
3. The data from all input sensors, the information of desired angle (computed according to PIN numbers) and sensor type information (vendor, resolution and so on) are fed into the ML algorithm after the feature engineering (if required). Combining the scores from various patched verification algorithms to compute the final verification score results in a decision by thresholding.

Extracting features from different scales and locations allows to catch different spoof scenarios:

1. showing a mannequin—while the head rotating person should look into the device monitor, in such case the eyes' movement should have specific characteristics. Namely, the gaze is directed at the monitor screen while the head is rotated. Rigid 3D face shape movement (e.g., of a doll) cannot mimic this behavior and fails the verification.
2. primitive deep fakes—the majority of deep fakes and face swap algorithms work perfectly with frontal face (when head Euler angle is close to zero). The greater the rotation angle, the worse the performance of the face swap algorithm. Namely, the image blending artifacts become visible, the face transition becomes blurry and "ugly". Additionally, the application of such an algorithm at a high frame rate produces a jittering effect. As result, the live and spoof attack frames have spatial temporal features that can be identified by an appropriate ML algorithm.
3. printed faces—to detect the spoofing attack by human face image printed at flat or twisted (curved) surface it is sufficient to analyze the face region. It is obvious that such shape cannot mimic the 3D human face rotation. As a result, even two RGB frames captured at different head rotation angles results in a competitive performance for this specific spoofing attack subset.

4. "fake head only" attacks—the head rotation leads to corresponding movement of human body and background occlusion. So, the full frame 3D verification should also have the features indicating a spoofing attack.

The minimal 3D face shape liveness verification process can be summarized as follows:

1. The image frame (or multiple image-like frames from different sensors) is captured when the user locates the face in front of the camera with minimal head rotation angles.
2. The frames are captured at all head rotation angles defined by PIN numbers.
3. The original frames and their derivatives (like optical flow, motion history images, restored by optical flow frames and other) are used as input into ML algorithm with preliminary feature extraction algorithm if required.

As an extension to minimal verification scheme, the additional information can be used in ML algorithm, multispectral and depth camera sensors, camera (device) manufactory information, internal camera parameters (ISO level, gain coefficients, noise suppression and other available settings). The liveness scores from a variety features scales are used to produce the final liveness score. The predefined threshold value as a function of camera output resolution is used to produce binary output "pass" or "fail". The motivation behind such an approach is that a better camera sensor can produce a higher confidence of the ML algorithm because of available information.

Figure 7:
FIG. 7 shows an example of 3D reconstruction after the passing liveness verification.

Additionally, the movement (mainly turning) of the human face in front of the camera is equivalent to the camera movement around the face. The face is treated as a rigid body (this statement is only true if the emotions, eye movement and face occlusions are eliminated during the frames capturing) as so the technique of "Shape/Structure from motion" is used. As such, the 3D shape can be derived from the session and can be used for 3D face recognition. FIG. 7 shows an example of 3D reconstruction after the passing liveness verification. The available camera calibration information can significantly enhance the 3D recognition result (see below for details).

5. Virtual Camera Verification 5.1 Camera Calibration Approach

The number of digital camera vendors is large, but still finite. Therefore, knowing the parameters of each camera calibration can significantly improve the accuracy of 3D face shape restoration. As a practical matter, it is impossible to have all cameras around the world available for calibration. Moreover, the camera calibration process itself is a labor-intensive process involving considerable human effort. This problem appears unsolvable at first glance. But in this particular case, it can be roughly solved even from a single verification sequence. Namely, human facial features have well-known sizes. For example, according to Wikipedia, "The average pupillary distance for adults is 63 millimeters, though most adults range between 50 and 75 millimeters. Children usually have an average pupillary distance of at least 40 millimeters", "The human iris ranges from 10.2 mm to 13.0 mm on average". Having such facial features detectors allows to get relative-to-specific face camera calibration.

There are also often objects with known size at the scene background (traffic signs, standard size furniture, standard room decoration, wall tiles, dropped ceilings and so on). This means that an object detector can be used to locate the object within the camera frame. In such a case with sufficient number of objects and facial features it is possible to obtain a more accurate camera calibration matrix. The camera calibration implies intrinsic camera parameters (including focus-related case) and optical distortions (radial and tangential distortions-fisheye, barrel and so on).

Having live sequencies (not fake) with known camera records, it is possible to solve the camera calibration problem. That is, from a number of sequences and prior knowledge of facial feature size distribution, it is possible to solve the camera calibration problem. It should be noted that unlike the conventional calibration algorithm, the result will be a camera calibration matrix and the pupil distance for each person.

The server-side system can be configured to iteratively accumulate camera calibration data. The calibration data can subsequently be used in an algorithm for restoring the 3D shape of the face, thereby increasing the quality of the restoration.

FIG. 7.1 depicts visualization and diagram of camera calibration. Pupil distance can be treated as side of chess board cell. The various positions are collected during the sessions because of head movement. This is somewhat similar to the traditional camera calibration by means of a chessboard.

The camera calibration pipeline is used as an additional source of data in the Live/Fake decision-making process. Experiments showed that deep fakes do not provide correct geometry translation of head rotation. Using deep fake (face swap) as a calibration sequence makes it impossible to solve the camera calibration problem, which is treated as a spoof attempt. In other words, a deep fake does not provide correct geometry translation of a human face, resulting in a numerical convergence issue of a calibration algorithm originally developed for a rigid body.

Correspondence of rigid bodies movements (human face, parts of background) should hold within the session's frames. Having a calibration matrix, this correspondence can be checked, as well as compared with camera movement (in case of mobile client application). For stationary devices, the algorithm should not calculate any movement. For portable devices, the movement of device (extracted from gyroscope, magnetometer, accelerometer, etc.) should correlate with movement estimated by binocular (or monocular) visual SLAM (simultaneous localization and mapping) algorithm. Put differently, the camera translation and rotations can be calculated according to the on onboard devices by solving kinematic equations. The same translation and rotation can be obtained from the camera sensor with visual SLAM approach. Here: in order to use visual SLAM approach, one should eliminate moving objects from scene and take into account only steady objects; the client devices like mobile phone usually have two simultaneously operating cameras, in this case the information about the camera motion can be obtained from both devices. With two independent approaches used for the camera translation and rotation estimation, the six degrees of freedom (3 angles and 3 coordinated) should match. Namely, the device coordinates and angles' difference should be less than a predefined threshold. The sequence is classified as a spoof attempt if a mismatch is detected.

It is obvious that the mismatch threshold is strongly dependent on quality of onboard devices and the camera frame quality and resolution. By collecting the data from variety of sessions, the decision mismatch thresholds can be calculated with knowledge of device movement by visual SLAM method. As soon as the camera calibration is obtained, the two positions of camera location are obtained. The first position is obtained from visual SLAM algorithm, the second from solving kinematic equations based on on-board devices' data. For specific client device model there is "single" unknown—the on-board devices displacement from camera. Hopefully, this displacement is constant, so it can be obtained from an optimization procedure. The optimization procedure implies the selecting the "live" and "spoof" authentication sequencies for certain device (the device with defined camera, gyroscope, accelerometer, magnetometer), minimize the camera (device) position mismatch calculated from both algorithms. The mismatch error values with the "live" and "spoof" labels can be used by a number of ML algorithms to obtain the classification threshold value.

5.2 Camera Texture Approach

Having a large data set of frames (greater than 1000, for example) for a certain type of camera, one can formulate a machine learning problem: "predict the type of camera given one or several frames". As soon as different vendors produce different camera chips with different digital signal processors and noise reduction settings, it became possible to solve this task with a high confidence for certain cameras. This can be solved by collecting the unbiased data for each camera sensor with corresponding camera setting (white balance, focus distance, ISO level and so on) and solving ML classification task. In this case the training of ML classifier is a standard task and can be performed by number of ML frameworks. Here the camera sensor type classifier can use a single or number of frames as well as patches or sequence of patches from different frame scales (face, facial features or backgrounds, for example).

After training, the ML classifier can predict the camera sensor type by means of camera frame or sequence of frames. The client software can read camera (sensor) information directly from the hardware device. If the two values do not match, the session is classified as spoof (fake). This approach is quite effective against deep fake spoofing attacks with combination of virtual camera usage. Namely, the simultaneous simulation of human behavior, camera sensor with combination of whole camera setting is quite complicated technical task. The complexity of this spoofing task is comparable or even more complex than creating an anti-spoofing algorithm.

5.3 Camera Interaction Approach

Some client-side applications allow performing direct interaction with the camera hardware. Switching or resetting camera device leads to a characteristic change in frames that are streamed from the camera. For example: camera reset (power off-power on) leads to subsequent setup of camera matrix gain factor, region of focus change (camera defocus) leads to transient process to focused state. Camera sensor gain factor depends on scene illumination. The camera sensor firmware estimates the appropriate gain factor depending on average scene illumination. Additionally, a number of other parameters is configured based on the scene. Automatic digital photo capturing technique by single camera implies two stages: the first stage is the estimation of the camera settings required for best available quality of photo, second is the actual photo capturing. Firmware of simple camera sensors uses basic computer vision algorithms to estimate appropriate camera settings, while more advanced firmware uses weak AI (Artificial Intelligence). For example, with AI the camera can be focused on a human face rather than use a semantic agnostic algorithm. While processing the frame sequence, there is no time to perform preliminary camera setting estimation. This means that focusing on other regions requires some time to adjust camera setting. In other words, violating any of camera setting (or camera reset) during the frame sequence leads to specific transient processes to optimal camera setting. These transient processes can be captured by ML/CV algorithm. Additional possible camera settings for this approach are changing frame resolution, white balance, noise suppression algorithm (if possible), gain control, frame rate, frame aspect ratio. The absence of camera characteristic behavior to the expected camera hardware setting change within the session is treated as a spoofing attempt.

6. Making a Liveness Decision

On one hand, the final decision should be made on the server side, and on the other hand, sometimes regulations prohibit storing personal information anywhere outside the client device without client permission. To overcome this difficulty the ML classifiers can be split into two parts. A number of ML algorithms allow to use this trick. For a neural network, this is done by means of graphs cut into number of parts. For classifiers with gradient boosting under hood (where the sequence of weak classifiers is used to subsequently improve the quality result) this can be done by splitting boosting steps. The majority of other algorithms used in ML/CV can be split at connection points between feature extraction and classification parts. So, the feature extraction part is executed on the client site while the classification part is executed on the server side. This approach also reduces the client-server traffic as well as this process is more secure when providing SDK to third parties (they have no way to decode personal information from ANN encodings). In frat, the originally trained classifier (here ANN) is a splitter. The part operating at client application does not allow to restore the original frame (the human face is treated as personal information) at the same time the final decision is performed at a server-side application, which protects the system from a simple client-side code reverse. Below, when discussing the saving of the original frames with personal information, the original frame or their derivatives by various type of classifiers should be stored into the memory or sent to the server.

7. Algorithm Description 7.1 Overall Algorithm

FIG. 8.1, FIG. 8.2, FIG. 8.3, FIG. 8.3.1, FIG. 8.3.2, FIG. 8.4, FIG. 8.5, FIG. 8.5.1, FIG. 8.6, FIG. 8.6.1, and FIG. 8.6.2 should be viewed as a single figure, and collectively illustrate various aspects of the liveness detection algorithm. The block diagram of the overall process is shown on FIG. 8.1. The application starts with the device configuration section. The method requires at least an RGB camera to make the liveness decision (see FIG. 8.2). At the same time additional data sources can be used to make the decision. Namely, Second RGB, Infrared, Depth camera can be used as additional frame sources as well as device positioning system (accelerometer, gyroscope, magnetometer). If an RGB camera is not available the system cannot perform the liveness verification.

As soon as required devices are configured the front part of the system starts to analyze the frames coming from the camera. On each frame the face detection is performed. The condition to proceed further is the requirement of single face detection for a number of subsequent frames. In the case when multiple faces are detected on a single frame the current session is closed, the user is notified about the presence of other faces and a new session is started. The session can be terminated as usual with a "fake" decision, without any notifications about the problem or the reason for the failure.

When a single face is detected, the user is prompted to take a selfie-like photo (see FIG. 8.3). This photo can be stored for the subsequent face recognition system. Usually the user is not looking at the camera in the right way, as well as the lighting conditions are bad (see FIG. 8.3.1). The user is iteratively guided to change head/body pose to passport like one (see FIG. 8.3.2). As soon as human position, lighting and noise, blur conditions are met the photo is stored in the memory. This session has a certain time limit. When the time's up the user is notified about the timeout and a new session starts. The front end application can suggest users to take a look into the guides and help videos in order to help him to pass this liveness stage. The client-side application contains the face quality estimation algorithm that allows to estimate the quality in real-time. For this reason, the confidence of the real-time algorithm does not have sufficient confidence. Therefore, the final quality estimation is done by server-side algorithm operating without such limitations.

As soon as the selfie frame is captured the front end application communicates with the server and takes the PIN number of length greater than one. The application can request a PIN number one by one as well. The PIN=[2, 4, 0] sequence is converted into the action list. Namely it is converted to the head rotation tasks. The user is asked to rotate the head with angles corresponding to the PIN. To convert PIN number to action the circle is divided into N=8 sections, the user's head angles Yaw, Pitch roll is projected on screen (camera) plane, the task of user is to match the point of projection into predefined region-sector part at radius corresponding to the 10-20 degrees of head rotations angles Yaw, Pitch (see FIG. 8.4).

The person starts from a selfie head/body pose and performs an action (head rotate to the certain Yaw and Pitch) corresponding to the PIN number (see FIG. 8.5). As soon as the first action completes, the frame (or the features derived from them-commonly used CV derivatives: optical flow, motion history images, as well as ML features obtained after a feature extraction part of ML algorithm) captured at this moment is saved to memory (sent to server—in this case the server-side application can construct the next PIN number based on all data received from client side application). If other devices are available, their data is also saved into the memory or sent to the server. The application is waiting for the person to rotate the head to a certain angle, depending on the PIN number. Each frame is analyzed for the image quality and well as head angles. As soon as all conditions are met, the frame is saved as a key frame (see FIG. 8.5.1).

When the application collects the required (length of PIN) number of frames the Liveness verification procedure is launched (see FIG. 8.6). The liveness is estimated by means of computing the liveness score from pseudo 3D approach (see FIG. 8.6.1), analyzing the head moving in 2D (Yaw, Pitch)/3D (Yaw, Pitch, Roll) space (see FIG. 8.4.1), 3D Liveness (see FIG. 8.6.1)

HEAD MOVE liveness is estimated by analyzing the PIN state machine and Yaw, Pitch, series (or X,Y series of data). If the device positioning information is available it is also attached to the algorithm estimating liveness score. The time series can be converted to phase map and analyzed in this future space.

The PSEUDO 3D approach is based on liveness score estimation from a pair of frames at significantly different angles (Yaw, Pitch). Additionally the optical flow (or motion history images) can be calculated from the pair of images. If a depth, infrared, ultraviolet camera is available the frames from the cameras are also attached to the score calculation algorithm. The core is estimated for all available pairs of images. The frames, depth and infrared frames, optical flow images can be appended by the phase maps (or any other information out the desired angles of head rotation) to perform classification with all available data. In such case the conditional verification (with respect to desired angles) PSEUDO 3D is performed. That is, it is possible to verify the rotation event and 3D shape at the same time.

3D LIVENESS score is estimated based on the derivation of the 3D point from the head rotation (shape from motion/shape from shading). For this reason target head rotation regions are optimized for positions required for 3D shape reconstruction. The reconstruction error is used for estimation of the liveness score. If the depth camera is available the depth can be retrieved from it. Infrared camera is also used as a data source for the face shape reconstruction. The availability of camera calibration of a client device significantly improves the 3D reconstruction quality. In such case, the absolute size of face features became available, as well as 3D face recognition became more accurate (i.e., higher confidence).

Any of collected frames (or neural features extracted from them) undergo a texture verification check at different scales (see FIG. 8.6) and virtual camera detection approaches.

8. System Architecture

The system has two primary parts: user-facing devices and server side components, see FIG. 9. With less secure configuration the server-side component can be a part of a client device/application. According to security standards the final liveness (as well as face recognition) decision cannot be performed on the client side because the result can be altered by software reverse engineering approaches. Meanwhile, there are a number of situations when client and server can be a single embodiment, like an ATM (automated teller machine) or automatic check point. Some applications of liveness system have a very low false negative cost (the system misclassifies the spoofing attack). An example of such a system can be personalized tickets to a sport event-spoofing the system at registration time does not guarantee the actual event attendance because of additional security control at event location.

A user-facing device collects biometric data prompting a user to perform necessary actions and submits data onto a server for further investigation.

A user-facing device should have a digital camera to collect facial data and a display to guide a user through the procedure. It can be for example a PC, a laptop, a mobile phone, a tablet, a self-service kiosk or terminal and any similar device.

The server side components are responsible for

Exchanging data, metadata and configuration information with a user-facing device Storing data, metadata and configuration information Performing a liveness check and storing a conclusion Returning data via API by a request When a user begins a liveness verification procedure, a UI SDK connects to a backend and proceeds a mutual handshake to avoid intrusions during the process. After establishing the connection the web server assigns a unique identifier to this transaction and registers a transaction in a database. Then the web server requests a core lib to generate a PIN. And finally the web server extracts a configuration file from a binary storage. Using all this data the web server sends a configuration file back to the UI SDK and this file is saved in the binary storage.

Receiving the configuration file from the web server the UI SDK shows on the display instructions for a user.

At the same time the UI SDK collects frames from the digital video camera and sends them to the tech module. The tech module analyzes frames and returns to the UI SDK what prompts should be displayed to the user.

Finally when the user completed all steps the tech module encrypts collected frame series and metadata and prepares a package. The UI SDK sends this package to the web server.

The web server saves this package into the binary storage and decrypts the one. After description the web server passes images and metadata to the Core lib. The Core lib analyzes liveness using this data and returns the result to the web server. The web server save this result into the binary storage and sends a response to the UI SDK.

Possible Applications

To pass the liveness test one, should pass all stages described in Table 1 below. All tests are binary classification tasks of the machine learning algorithm.

TABLE 1

Liveness verification stages

| Stage | Substages | Required |
|---|---|---|
| Session identification check | The response of the client and the server-side PIN generation should match | Session ID obtained from server should be sent back |
| 3D Face check | The object in front of the camera should be 3D object<br>The 3D shape of the object should be the shape of the real human face | Two image patches of the image with a human face. One from centered face position one from rotated head position |
| Face texture check | The face region must be of good quality (focused, without motion blur and so on)<br>The moiré and compression artifacts should not be present within frame patch<br>Deep fake artifacts should not be present within frame patch<br>The artifacts of print attack (glares, scratches and so on) should not be present | Single face patch of central face position or rotated face position. There is an option to check face skin texture only on the central face and rotated as well. |
| Global scene analysis | The parts of the electronic devices should not be present in frame<br>The face (parts of the face) should not be occluded | Single frame of central face position or rotated face position. There is an option to check face skin texture only on the central face and rotated as well. |
| Object behavior analysis | Each stage should be performed within finite time<br>Each stage should not be substituted by another one<br>Trivial pass scenarios should not pass the test<br>The user's face should be always within field of camera view during the verification session | Face detection information on sequence of frames. The detection information is the position of the face, the face rotation information, and facial landmarks positions. Basically, the video sequence can be analyzed, but the information about the face position is available from the previous stages of analysis, so only face position can be analyzed. |
| Virtual camera defection | The head should obey the rotational laws of a rigid body with corresponding camera-frame projection | Face detection at each frame for various head rotation angles. |
| | Different cameras should be distinguishable by capturing textures | Single or multiple frames from the camera. |

FIG. 10 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

FIG. 11 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

Non-Patent Literature

[1] Wei Bao, Hong Li, Nan Li & Wei Jiang. (2009). A liveness detection method for face recognition based on optical flow field. 2009 International Conference on Image Analysis and Signal Processing. doi: 10.1109/iasp.2009.5054589

[2] Lagorio, A., Tistarelli, M., Cadoni, M., Fookes, C., & Sridharan, S., *Liveness detection based on 3D face shape analysis,* 2013 International Workshop on Biometrics and Forensics (IWBF), doi: 10.1109/iwbf.2013.6547310 (2013)

[3] ICAO Technical Report, Portrait Quality (Reference Facial Images for MRTD) https . . .

www.icao.int . . . / . . . . Security/FAL/TRIP/Documents/ TR % 20-% 20Portrait %20Quality %20v1.0.pdf Patent Literature 1. U.S. Pat. No. 9,117,109 B2
2. KR 102126722 B1
3. US20080192980 A1
4. WO 2011156143 A2
5. U.S. Pat. No. 10,250,598 B2
6. U.S. Pat. No. 10,685,251 B2
7. U.S. Pat. No. 9,117,109 B2
8. KR 102126722 B1
9. US20080192980 A1
10. WO 2011156143 A2
11. WO 2011156143 A2
12. U.S. Pat. No. 10,250,598 B2
13. U.S. Pat. No. 10,685,251 B2
14. WO 2018009568 A1
15. U.S. Pat. No. 10,331,942 B2
16. U.S. Pat. No. 10,691,939 B2
17. U.S. Pat. No. 11,335,119 B1
18. US20090135188 A1
19. EP 3332403 B1
20. CN 109684924 B
21. U.S. Pat. No. 11,048,953 B2
22. WO 2020000908 A1
23. U.S. Pat. No. 10,796,178 B2
24. CN 108229239 B
25. U.S. Pat. No. 10,360,442 B2
26. U.S. Pat. No. 10,990,808 B2
27. US20220083795 A1
28. U.S. Pat. No. 11,093,731 B2
29. US20220148336 A1
30. US20220343680 A1
31. US20210224523 A1
32. U.S. Pat. No. 11,321,963 B2
33. U.S. Pat. No. 10,438,077 B2
34. U.S. Pat. No. 10,671,870 B2
35. US20200334853 A1
36. US20200184700 A1

What is claimed is:

1. A method of 3D face shape verification, comprising:

verifying that a user is positioned in front of a user device so that head rotation angles are no more than 10 degrees;

capturing an image of the user's head at an initial position;

generating a PIN and transmitting it to the user device;

upon receipt of the PIN, instructing the user to rotate his head to a first position indicated by the PIN and a corresponding graphic;

capturing an image of the user's head at the first position;

repeating instructions to the user to rotate his head for all remaining values of the PIN, and capturing images of the user's head at positions corresponding to the remaining values of the PIN;

transforming yaw and pitch angles of the user's head in all the captured images into a graph in polar coordinates;

transforming the graph into a phase map;

sending the phase map into a classifier;

determining, using the classifier, whether the user's head is a live 3D face or a different object; and outputting a result of the determination.

2. The method of claim 1, wherein the classifier is a neural network classifier.

3. The method of claim 1, wherein the classifier is split between a server and the user's device.

4. The method of claim 1, wherein the classifier runs on a server.

5. The method of claim 1, wherein the determining step is performed on a server.

6. The method of claim 5, wherein the determining step includes selecting positions of face features and transforming their coordinates into the graph and estimating a liveness score by using actual head movement and requested head positions determined by a PIN sequence.

7. The method of claim 5, wherein the determining includes estimating a liveness score according to:

selecting an image with a best score;

predicting regions of the image to be analyzed; and computing a liveness score of individual frame patch.

8. The method of claim 7, wherein the estimating includes:

collecting at least two subsequent images;

for each collected image, estimating a single-image liveness score; and for each pair of images, estimating a multiple-image liveness score.

9. The method of claim 7, wherein the estimating a liveness score includes:

using information about a camera calibration matrix of a camera of the user device, wherein the camera calibration matrix is obtained from user device driver information and machine learning texture classifier;

performing calibration through a saved table of camera calibration matrixes obtained through solving an optimization problem with facial feature mean size regularization and sizes of identified objects with respect to the camera calibration matrix and size of face feature.

10. The method of claim 7, further comprising sending derivatives of the regions to the server when sending session data to the server.

11. A method of 3D face shape verification via motion history images, the method comprising:

verifying that a user is positioned in front of a user device so that head rotating angles are no more than 10 degrees;

capturing an image of the user's head at an initial position;

generating a PIN and transmit it to a user device;

upon receipt of the PIN, instructing the user to rotate his head to a first position indicated by the PIN and a corresponding graphic;

repeating instructions to the user to rotate his head for all remaining values of the PIN, and capturing images of the user's head at positions corresponding to the remaining values of the PIN;

selecting positions of face features and transforming coordinates of the positions into a graph in polar coordinates;

transforming the graph into a phase map;

sending the phase map into a classifier;

determining, using the classifier, whether the user's head is a live 3D face or a different object; and outputting a result of the determining.

* * * * *